United States Patent
Koide et al.

(10) Patent No.: US 10,491,544 B2
(45) Date of Patent: Nov. 26, 2019

(54) CONSISTENCY CONTROL OF A LOGICAL PATH PASSING THROUGH A RELAY DEVICE

(71) Applicant: FUJITSU LIMITED, Kawasaki-shi, Kanagawa (JP)

(72) Inventors: Arata Koide, Shinagawa (JP); Shigeki Sekine, Ota (JP); Shotaro Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/111,285

(22) Filed: Aug. 24, 2018

(65) Prior Publication Data
US 2019/0068525 A1    Feb. 28, 2019

(30) Foreign Application Priority Data
Aug. 30, 2017  (JP) .................................. 2017-165585

(51) Int. Cl.
*H04L 12/935* (2013.01)
*H04L 12/931* (2013.01)

(52) U.S. Cl.
CPC ............ *H04L 49/30* (2013.01); *H04L 49/357* (2013.01)

(58) Field of Classification Search
CPC .............................. H04L 49/30; H04L 49/357
See application file for complete search history.

(56) References Cited

U.S. PATENT DOCUMENTS

| | | | | |
|---|---|---|---|---|
| 2003/0105934 A1* | 6/2003 | Kimura | ............... | G06F 11/1679 711/167 |
| 2004/0165095 A1* | 8/2004 | Shimizu | ................... | G02B 3/04 348/335 |
| 2007/0094530 A1 | 4/2007 | Kakizaki et al. | | |
| 2009/0303936 A1* | 12/2009 | Inoue | ................ | H04L 29/12009 370/328 |
| 2012/0131237 A1* | 5/2012 | Naganuma | ............ | G06F 3/0227 710/38 |

FOREIGN PATENT DOCUMENTS

| | | |
|---|---|---|
| JP | 2004-164490 | 6/2004 |
| JP | 2007-115138 | 5/2007 |

* cited by examiner

*Primary Examiner* — Duc C Ho
(74) *Attorney, Agent, or Firm* — Fujitsu Patent Center

(57) ABSTRACT

A relay device stores first logical-path information indicating information on communication logical paths used for communication between an information processing apparatus and an input and output device, where the communication logical paths each includes a device logical path used between the relay device and the input and output device. Upon detection of a mismatch between the first logical-path information and second logical-path information that is requested from the information processing apparatus and includes information on target communication logical paths to be used for communication between the information processing apparatus and the input and output device, the relay device controls setting of the device logical path included in each of the communication logical paths so that the communication logical paths are consistent with the target communication logical paths indicated by the second logical-path information.

8 Claims, 17 Drawing Sheets

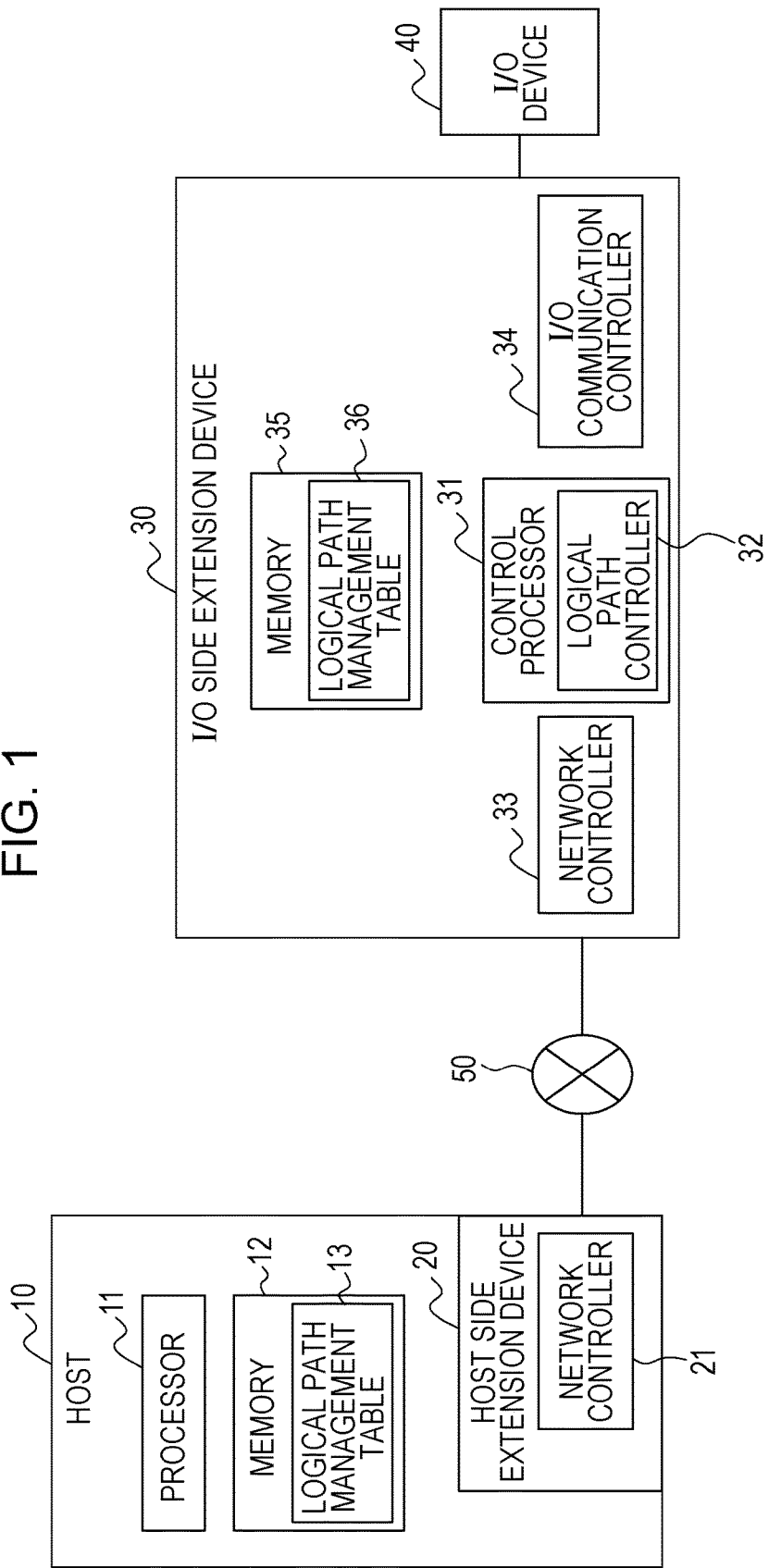

FIG. 2B

| LOGICAL PATH NUMBER | CHLA | CHLK | CULK | CULA | LOGICAL PATH VALIDITY FLAG |
|---|---|---|---|---|---|
| A | 0 | a | b | 0 | VALID |
| B | 1 | a | b | 0 | INVALID |
| ... | ... | ... | ... | ... | ... |
| N | N | a | b | 0 | VALID |

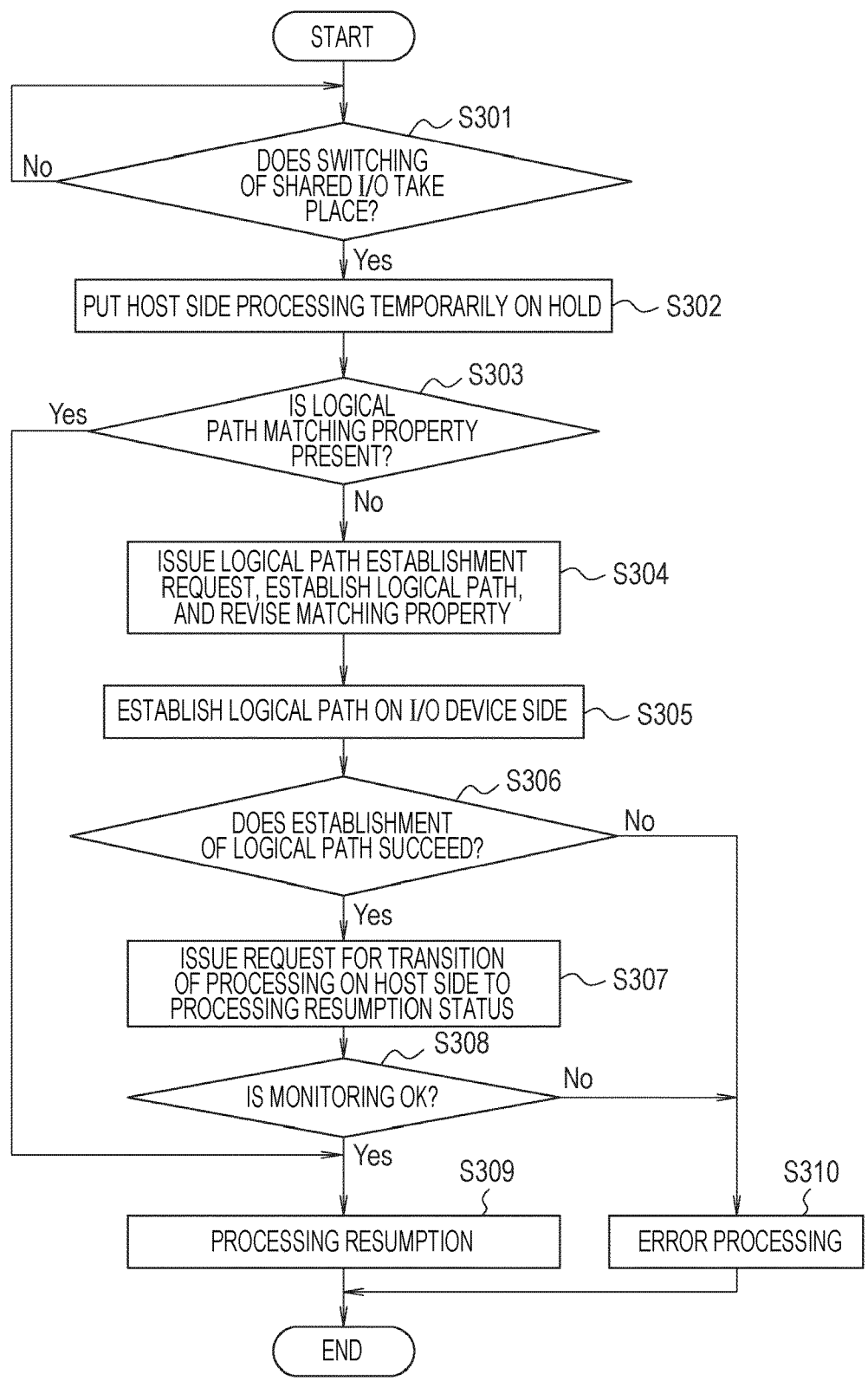

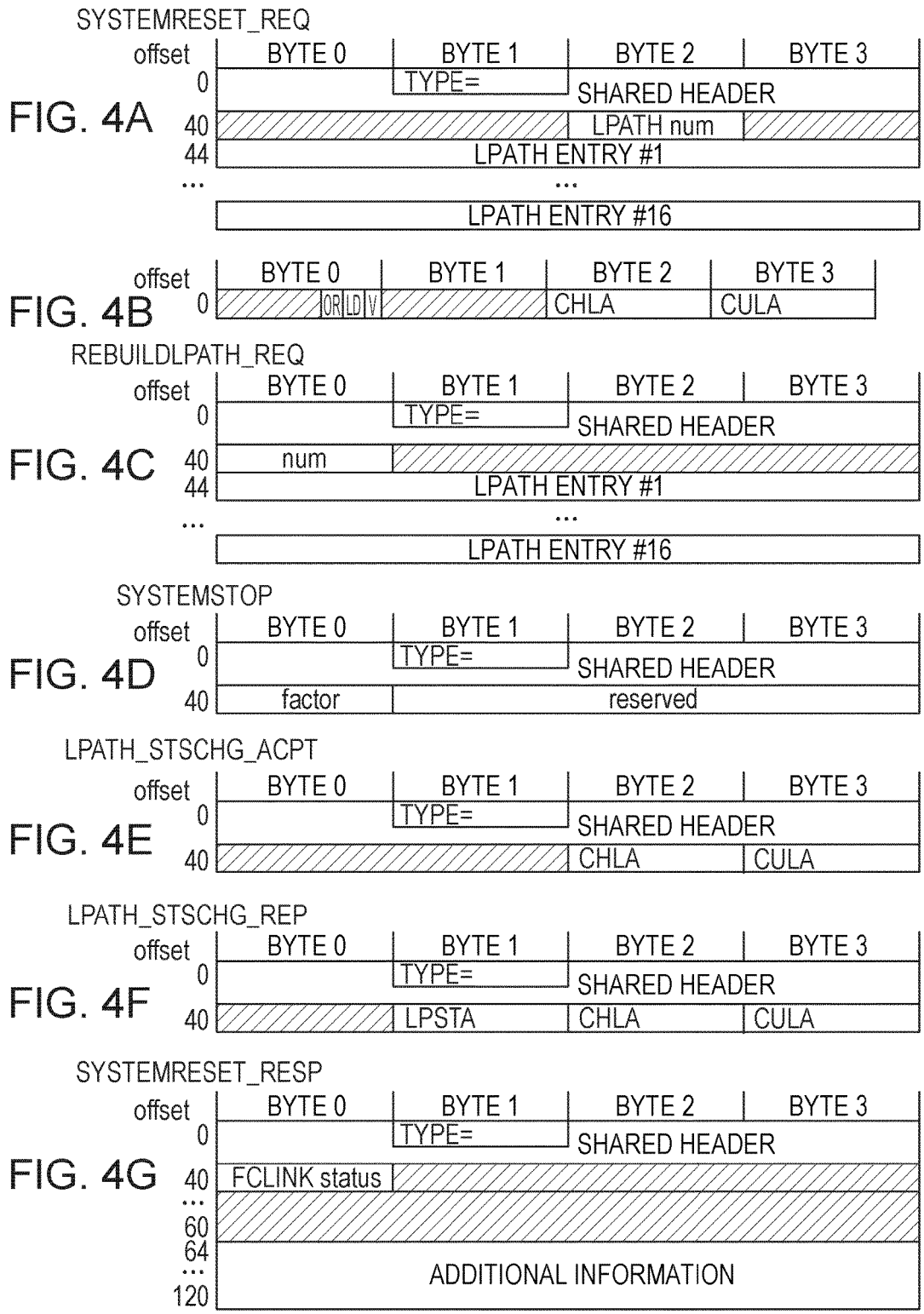

CONSISTENCY CONTROL OF A LOGICAL PATH PASSING THROUGH A RELAY DEVICE

CROSS-REFERENCE TO RELATED APPLICATION

This application is based upon and claims the benefit of priority of the prior Japanese Patent Application No. 2017-165585, filed on Aug. 30, 2017, the entire contents of which are incorporated herein by reference.

FIELD

The embodiment discussed herein is related to consistency control of a logical path passing through a relay device.

BACKGROUND

A host (an information processing apparatus), such as a server, and an input and output device (I/O device) are necessarily installed within a distance of approximately 100 m from each other for a Block Multiplexer Channel (BMC) connection that is used for an electric cable, and within a distance of several kilometers from each other for an Optical Channel LINK (OCLINK) connection that is used for an optical fiber cable. In contrast, there is a system in which a communication channel between the host (the information processing apparatus) and the input and output device (I/O device) is extended using an extension device (a relay device), and thus, utilization between long-distance points is made possible.

In this system, the host and the extension device are coupled via a network, such as a wide area Ethernet (a registered trademark) that uses a Transmission Control Protocol/Internet Protocol (TCP/IP), which does not have a distance limitation, and the extension device and the I/O device are coupled through an FCLINK connection or the like, which has the distance limitation. The FCLINK connection employs a connection scheme in compliance with Fibre Channel (FC)-Single Byte (SB)-2 standard. Accordingly, the utilization between the long-distance points, between which the host and the I/O device are positioned by a long distance, is possible.

Japanese Laid-open Patent Publication Nos. 2004-164490 and 2007-115138 are examples of the related art.

SUMMARY

According to an aspect of the invention, a relay device stores first logical-path information indicating information on communication logical paths used for communication between an information processing apparatus and an input and output device, where the communication logical paths each includes a device logical path used between the relay device and the input and output device. Upon detection of a mismatch between the first logical-path information and second logical-path information that is requested from the information processing apparatus and includes information on target communication logical paths to be used for communication between the information processing apparatus and the input and output device, the relay device controls setting of the device logical path included in each of the communication logical paths so that the communication logical paths are consistent with the target communication logical paths indicated by the second logical-path information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of a configuration of a transmission and reception system according to an embodiment;

FIG. 2B is a diagram for describing an example of a logical path management table;

FIG. 3 is a diagram illustrating an example of operation of the transmission and reception system according to the embodiment;

FIGS. 4A to 4G are diagrams, each for describing a frame relating to logical path control according to the embodiment;

DESCRIPTION OF EMBODIMENT

Figure 2A:
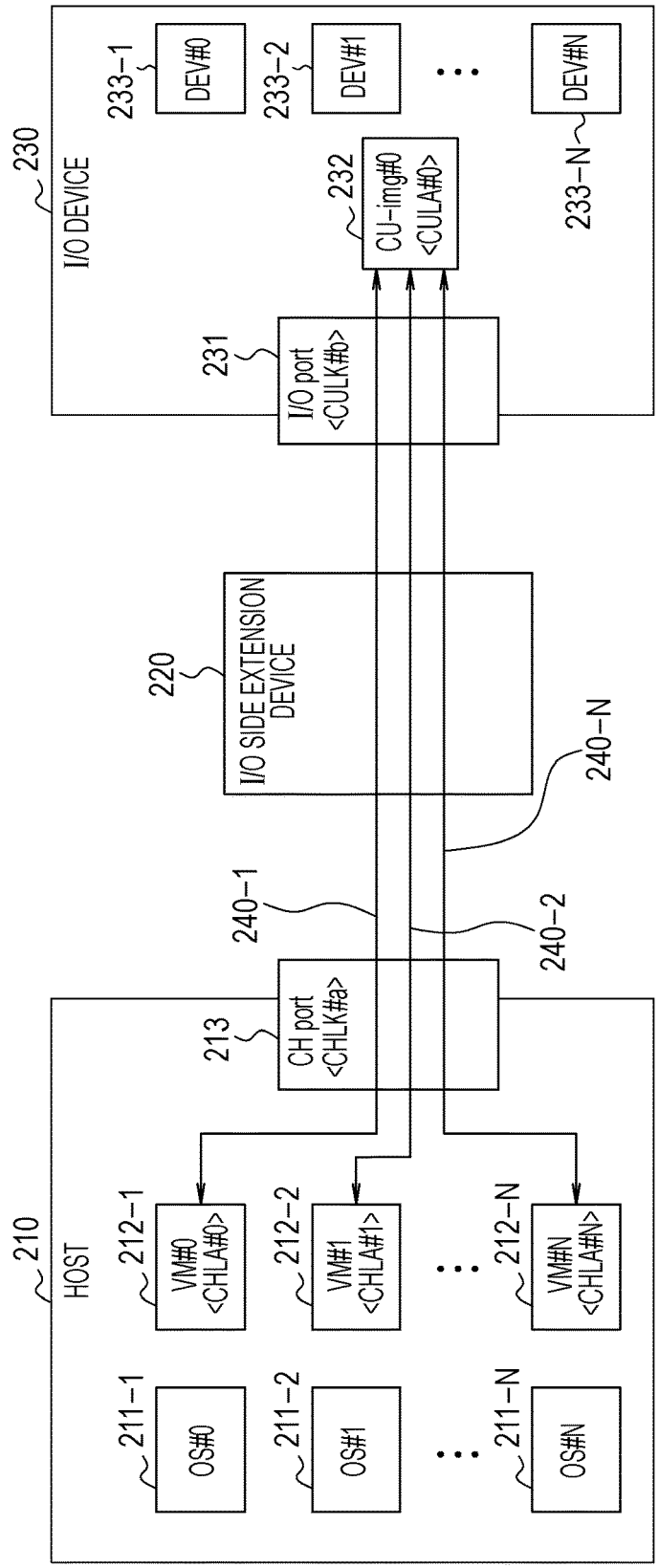
FIG. 2A is a diagram for describing a logical path in the transmission and reception system according to the embodiment.

Generally, in a case where communication between the host and the I/O device that are coupled through the FCLINK connection is performed, a logical path on a physical communication channel between the host and the I/O device is established using information on the logical paths, and thus the communication is performed. In the system in which, described above, the host and the extension device are coupled via a network and the extension device and the I/O device are coupled through the FCLINK connection, in order to establish the communication between the host and the I/O device, establishment of communication between the extension device and the I/O device is also needful, but a mismatch may occur to an establishment status of the logical path with establishment status of the logical path being inconsistent with a request from the host. When the logical path mismatch occurs, because the communication is not established between the host and the I/O device, normal utilization is difficult.

An embodiment will be described in detail below with reference to the drawings.

A transmission and reception system according to the embodiment is a remote channel type system in which host side extension device is built into a host (an information processing apparatus) such as a server, in which an I/O device (an input and output device) is coupled to an I/O side extension device (a relay device), and in which the host side extension device and the I/O side extension device are coupled through a network such as a wide area Ethernet. It is noted that the configuration in which the host side extension device is built into the host is described as an example, but that a configuration in which the host side extension device is positioned outside of the host and the host and the host side extension device are coupled to each other may be employed.

FIG. 1 is a diagram illustrating an example of a configuration of the transmission and reception system according to the present embodiment. In the transmission and reception system that is illustrated in FIG. 1, the host side extension device 20 is included in a host 10 such as a server. An I/O side extension device 30 and an I/O device 40, for example, is coupled through an FCLINK connection that employs a connection scheme in compliance with a Fibre Channel (FC)-Single Byte (SB)-2 standard, and the host side extension device 20 and the I/O side extension device 30 are coupled via a network 50, such a wide area Ethernet, over which communication is performed using Transmission Control Protocol/Internet Protocol (TCP/IP).

The host 10 as the information processing apparatus includes a processor 11, a memory 12, and a host side extension device 20. The processor 11 is a Central Processing Unit (CPU) that executes software or the like. The processor 11, for example, instructs the I/O device 40 to perform an input and output operation or the like, or makes a request to switch between using and not using the I/O device 40. Various pieces of data relating to processing in the host 10 are stored in the memory 12. A logical path management table 13 listing information on a logical path relating to communication between the host 10 and the I/O device 40 is stored in the memory 12. The host side extension device 20 includes a network controller 21. In order to communicate with the I/O side extension device 30, the network controller 21 executes control of network communication such as TCP session management in the network 50.

The I/O side extension device 30 as the relay device includes a control processor 31, a network controller 33, an I/O communication controller 34, and a memory 35. The control processor 31 performs control processing "such as processing" on the I/O device 40 in response to a request from the host 10, where the controller 31 may be configured to include a processor such as a CPU. The control processor 31 includes a logical path controller 32 that executes control or the like of the logical path between the I/O side extension device 30 and the I/O device 40 based on the request from the host. The logical path controller 32 controls the logical path between the I/O side extension device 30 and the I/O device 40 in response to a request or the like from the host 10. In a case where a mismatch between the logical path that is requested by the host 10 and a logical path that is indicated in a logical path management table 36 is detected, the logical path controller 32 establishes or removes a logical path in such a manner that a match is made.

In the same manner as the network controller 21, the network controller 33 controls the network communication in the network 50. The I/O communication controller 34 performs communication with the I/O device 40, issues a command to the I/O device 40, or notifies a status from the I/O device 40. Various pieces of data relating to processing on the I/O side are stored in the memory 35. The logical path management table 36 listing the information on the logical path relating to the communication between the host 10 and the I/O device 40 is stored in the memory 35. The I/O device 40 performs the input and output operation or the like in response to an instruction from the host 10.

FIG. 2A is a diagram for describing the logical path in the transmission and reception system according to the embodiment. In the host 210, processing operations by a plurality of operating systems (OS) 211-1 to 211-N are performed in virtual machines (VM) 212-1 to 212-N, respectively. Each of the virtual machines (VM) 212-1 to 212-N is configured to connect with to I/O device 230 via a channel port 213 and an I/O side extension device 220 of the host side extension device. In the I/O device 230, a controller 232 receives an instruction, such as one through an input and output operation, from the host 210 via an I/O port 231, and controls devices 233-1 to 233-N, where the controller 232 may be configured to include a processor such as a CPU.

In the transmission and reception system with this configuration, logical paths 240-1 to 240-N are established between each of the virtual machine (VM) 212-1 to 212-N on the host 210 and the controller 232 of the I/O device of the I/O device 230, respectively, and thus communication is performed. A Channel Logical Address (CHLA) is assigned to each of the virtual machine (VM) 212-1 to 212-N, and a Channel Link Address (CHLK) is assigned to the channel port 213. Furthermore, an address CU Logical Address (CULA) is assigned to a controller 231, and an address Channel Link Address (CULK) is assigned to an I/O port 232. At this point, the address CHLA is an address for identifying a logical program that runs on a channel, and the address CHLK is an address that is assigned to a logical port of a channel. Furthermore, an address CULA is an address for identifying a logical program that runs on a controller, and the address CULK is an address that is assigned to a physical port of the controller.

Then, for example, based on the information on the logical path that the host 210 has as a logical path management table as illustrated in FIG. 2B, the host 210 establishes the logical paths 240-1 to 240-N between each of the virtual machines (VM) 212-1 to 212-N of the host 210 and the controller 232 of the I/O device 230, and thus performs communication. The logical path management table, for example, lists a logical path number indicating each of the logical paths, addresses CHLA, CHLK, CULK, and CULA, and information of an logical path validity flag. The logical path management table with this configuration is stored in the memory 12 of the host 10 or the memory 35 of the I/O side extension device 30, which is illustrated in FIG. 1. It is noted that the logical path validity flag is a flag indicating whether or not the logical path is present, and that if the logical path validity flag is valid, the logical path is present.

At the time of switching between virtual machines (hosts) that use the I/O device which is shared, and so forth, in some cases, a logical path relating to communication with an I/O device that is designated by the virtual machine (host) and a logical path between an I/O side extension device and the I/O device disagree with each other, and a mismatch occurs to logical paths relating to communication between the virtual machine (host) and the I/O device takes place. At this time, in the embodiment, the logical path between the I/O side extension device and the I/O device is revised as illustrated in FIG. 3, and thus a logical path mismatch is overcome. FIG. 3 is a diagram illustrating an example of operation of the transmission and reception system according to the embodiment. FIG. 3 illustrates the I/O device that is shared, and an example of an operation that is performed when the shared I/O device switches from a state of being used by a certain machine (host) to a state of being used by another virtual machine (host).

In Step S301, the host side extension device 20 and the I/O side extension device 30 determines whether or not the switching of the shared I/O device takes place in the host 10, and when it is determined that the switching of the shard I/O device takes place, proceeds to Step S302. In Step S302, the host 10 temporarily put processing on hold according to the switching of the shared I/O device.

Next, in Step S303, the I/O side extension device 30 compares the information on the logical path from the host 10 and the information on the logical path that is retained in the logical path management table 36, and determines whether the logical path relating to the communication between the host 10 and the I/O device 40 has a matching property. In a case where it is determined that the logical path relating to the communication between the host 10 and the I/O device 40 does not have the matching property, proceeding to Step S304 takes place, otherwise proceeding to Step S309 takes place. In Step S304, the I/O side extension device 30 issues a logical path establishment request to the I/O device 40 based on the information on the logical path from the host 10 so as to provide consistency in the established logical path. In response to the logical path establishment request, in Step S305, processing for establishing the logical path is performed on the I/O device side.

Next, in Step S306, the I/O side extension device 30 determines whether or not the establishment of the logical path having the matching property succeeds. In a case where it is determined that the logical path is established, proceeding to Step S307 takes place, and in a case where it is determined that the logical path is not established, proceeding to Step S310 takes place. In Step S307, a request for transition of processing on the host side to processing resumption status is issued. Thereafter, monitoring of a connected status of a network, such as a timeout in the network communication, is performed. If the result of monitoring is OK (Yes in S308), proceeding to Step S309 takes place, and if not, proceeding to Step S310 takes place. In Step S309, in the transmission and reception system, the processing by the host 10 is resumed. On the other hand, in a case where the proceeding to Step S310 takes place, it is determined that there is a temporary error, and thus error processing is performed to end the processing.

Next, logical path control by the I/O side extension device 30 according to the embodiment will be described. First, a frame that is used for an operation for the logical path control according to the embodiment is described. In the operation for the logical path control according to the embodiment, frames for a system reset request, a logical path control request, a system stop notification, a logical path status reception notification, a logical path status notification, and a system reset response are used.

The system reset request (SYSTEMRESET_REQ) is a system start request, and is transmitted from the host side extension device 20 to the I/O side extension device 30. The system reset request is used to reset a FCLINK interface between the I/O side extension device 30 and the I/O device 40 in association with startup of the host side extension device 20 or reconnection of a working session in TCP/IP communication between the host side extension device 20 and the I/O side extension device 30. FIG. 4A illustrates an example of a format of the frame for the system reset request (SYSTEMRESET_REQ).

Information indicating the presence of the system reset request is stored in a field TYPE of a common header. Furthermore, in a field LPATH num, information indicating the number of logical path entries that this frame has is stored. Each of the logical path (LPATH) entries has information that is illustrated in FIG. 4B. In FIG. 4B, for a bit OR, in a case where removal of the logical path that is indicated in the logical path entry is to be performed but the removal of the logical path is not performed yet, a value "1" is set. For a bit LD, in a case where the logical path that is indicated in the logical path entry is defined in terms of configuration, the value "1" is set. Furthermore, for a bit V, in a case where the logical path entry is valid, the value "1" is set. The address CHLA on the host side is stored in a field CHLA, and the address CULA on the I/O device side is stored in a field CULA.

With a TCP session connection (reconnection), the host side extension device 20 is triggered to transmit the system reset request to the I/O side extension device 30. Upon receiving the system reset request from the host side extension device 20, the I/O side extension device 30 causes the I/O device in operation to be ended and thus removes (resets) all the logical paths between the I/O side extension device 30 and the I/O device 40. After the removal (reset) of the logical paths is ended, the I/O side extension device 30 transmits the system reset response containing a result of the reset to the host side extension device 20. It is noted that after transmitting the system reset request, the host side extension device 20 does not transmit other data until receiving the system reset response. Furthermore, the host side extension device 20 performs timeout detection relating to the system reset request. In a case where a response to the system reset request is not received within a prescribed time period after the system reset request is transmitted, the host side extension device 20 determines that a timeout has occurred, and releases the working session.

The logical path control request (REBUILDLPATH_REQ) is used to provide an instruction for establishing or deleting the logical path between the I/O side extension device 30 and the I/O device 40, and is transmitted from the host side extension device 20 to the I/O side extension device 30. The I/O side extension device 30 executes the control of the logical path in accordance with the logical path control request. FIG. 4C illustrates an example of a format of the frame for the logical path control request (REBUILDLPATH_REQ).

Information indicating the presence of the logical path control request is stored in the field TYPE of the common header. Furthermore, in a field num, information indicating the number of logical path entries that this frame has is stored. Each of the logical path (LPATH) entries has the information that is illustrated in FIG. 4B.

At the time of the connection (which includes the reconnection) of the working session between the host side extension device 20 and the I/O side extension device 30, or in a case where there is an instruction from an input and output controller (IOP) that controls input and output of data or the like between software running on the host 10 and the host side extension device 20, the host side extension device 20 transmits the logical path control request to the I/O side extension device 30. It is noted that the logical path control request is transmittable without depending on a status between the I/O side extension device 30 and the I/O device 40. Upon receiving the logical path control request from the host side extension device 20, the I/O side extension device 30 performs the logical path control in accordance with the received logical path control request. The I/O side extension device 30 transmits a result of the logical path control to the host side extension device 20 by using the logical path status notification.

In association with channel offline or cluster switching, the system stop notification (SYSTEMSTOP) is used to stop processing between the I/O side extension device 30 and the I/O device 40, and is transmitted from the host side extension device 20 to the I/O side extension device 30. It is noted that the channel offline is an operation that releases communication between the host side extension device 20 and the I/O side extension device 30, and the cluster switching is an operation that causes switching from the host side extension device 20 (the host 10) that is connected to the I/O side extension device 30. FIG. 4D illustrates an example of a format of the frame for the system stop notification (SYSTEMSTOP). In the field TYPE of the common header, information indicating the presence of the system stop notification is stored. In a field factor, information indicating a factor for the system stop is stored.

When notified of the channel offline or cluster release by a device management unit of the host 10, which is not illustrated, the host side extension device 20 is triggered to transmit the system stop notification to the I/O side extension device 30. Upon receiving the system stop notification from the host side extension device 20, the I/O side extension device 30 causes the I/O device in operation to be ended and thus removes all the logical paths between the I/O side extension device 30 and the I/O device 40.

The logical path status reception notification (LPATH_STSCHG_ACPT) is used as a response to the logical path status notification that is transmitted from the I/O side extension device 30, and is transmitted from the host side extension device 20 to the I/O side extension device 30. FIG. 4E illustrates an example of a format of the frame for the logical path status reception notification (LPATH_STSCHG_ACPT). Information indicating the presence of the logical path status reception notification is stored in the field TYPE of the common header. The address CHLA on the host side is stored in the field CHLA, and the address CULA on the I/O device side is stored in the field CULA.

In a case where a change occurs in a status of the logical path, the logical path status notification (LPATH_STSCHG_REP) is used to report the occurrence of the chance and is transmitted from the I/O side extension device 30 to the host side extension device 20. FIG. 4F illustrates an example of a format of the frame for the logical path status notification (LPATH_STSCHG_REP). Information indicating the present of the logical path status notification is stored in the field TYPE of the common header. For a field LPSTA, if a sequence of logical path establishment processing steps succeeds, a value "1" is set for the least important bit. The address CHLA on the host side is stored in the field CHLA, and the address CULA on the I/O device side is stored in the field CULA.

The system reset response (SYSTEMRESET_RESP) is used as a response to the system reset request that is transmitted from the host side extension device 20, and is transmitted from the I/O side extension device 30 to the host side extension device 20. FIG. 4G illustrates an example of a format of the frame for the system reset response (SYSTEMRESET_RESP). Information indicating the presence of the system reset response is stored in the field TYPE of the common header.

Information indicating a status of connection between the I/O side extension device 30 and the I/O device 40 is stored in a field FCLINK Status. Examples of the status of connection include an offline status where the establishment of the logical path is impossible due to power-off of the I/O device or the like, an offline status where the establishment of the logical path is possible, and an error-ended status where an abnormality is detected in a sequence of processing steps relating to the system reset request. Different values are stored in the field FCLINK Status in accordance with the respective statuses. Furthermore, additional information in accordance with the field FCLINK Status is stored in the system reset response.

After performing control in accordance with the system reset request, the I/O side extension device 30 transmits the system reset response to the host side extension device 20. The host side extension device 20 performs processing in the offline status until receiving the system reset response from the I/O side extension device 30.

Next, an operation relating to the logical path control in the transmission and reception system according to the embodiment will be described. In the embodiment, the logical path control is executed in initialization processing, resetting and ending processing, and the logical path control processing. The logical path control in each processing step will be described below.

Figure 5:
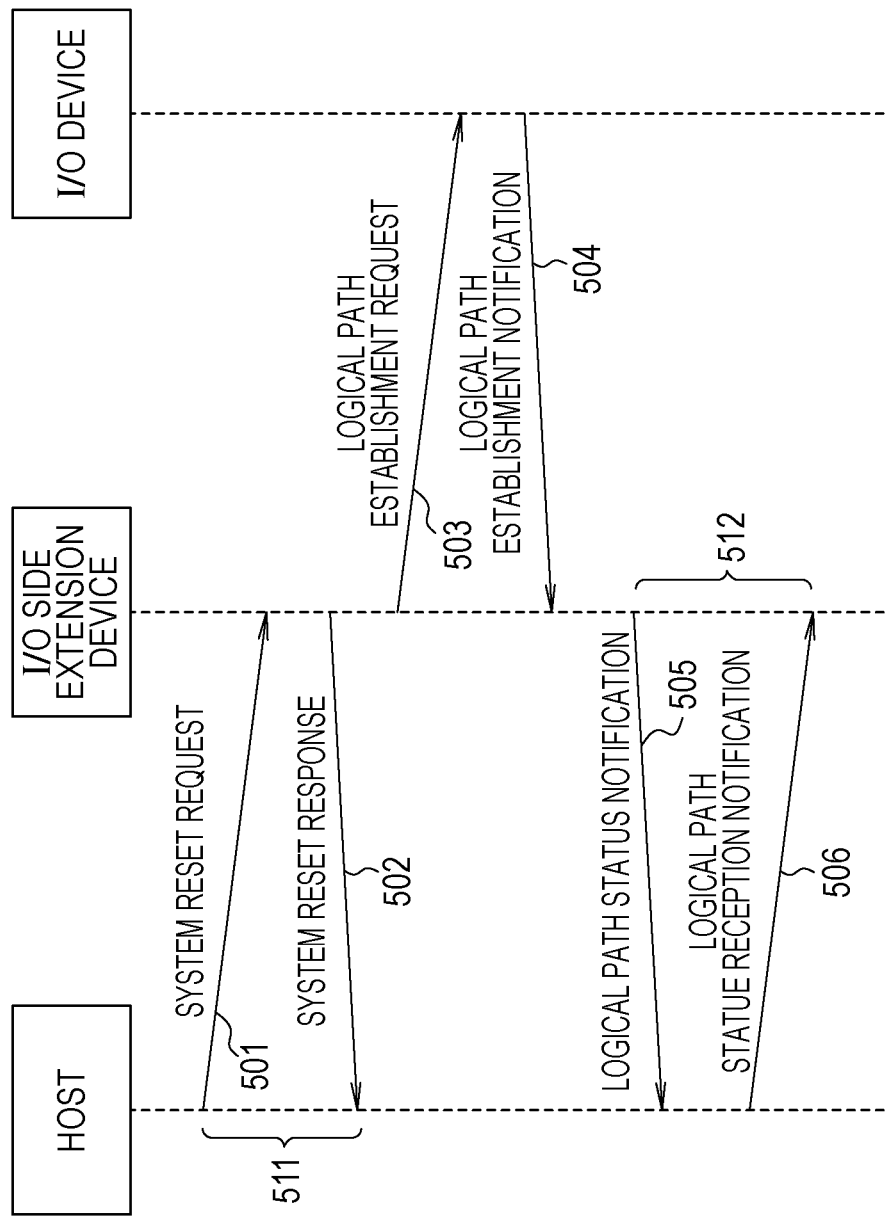
FIG. 5 is a diagram illustrating an example of a processing sequence for initialization processing according to the embodiment.

FIG. 5 is a diagram illustrating an example of a processing sequence for initialization processing in the transmission and reception system according to the embodiment. At the time of activation of the host 10, after the TCP session connection between the host side extension device 20 and the I/O side extension device 30, the host side extension device 20 transmits the system reset request and thus the initialization processing is performed.

The host 10 (the host side extension device 20) transmits the system reset request (SYSTEMRESET_REQ) to the I/O side extension device 30 (501), and the I/O side extension device 30 transmits the system reset response (SYSTEMRESET_RESP), as a response to the system reset request (SYSTEMRESET_REQ), to the host 10 (502). The host 10 (the host side extension device 20 transmits the system reset request (SYSTEMRESET_REQ) and then, monitors the response to the system reset request (SYSTEMRESET_REQ) (511). When the system reset response (SYSTEMRESET_RESP) is not received until a prescribed period of time elapsed, the host 10 determines that the timeout has occurred, and releases the session.

Upon receiving the system reset request (SYSTEMRESET_REQ) from the host 10 (the host side extension device 20), the I/O side extension device 30 transmits the logical path establishment request (ELP: EstablishLogicalPath) for establishing the logical path that is requested in the logical path entry of the system reset request, to I/O device 40 (503). Upon establishing the logical path that is requested by the logical path establishment request (ELP), the I/O device 40 transmits a logical path establishment notification (LPE: LogicalPathEstablished) to the I/O side extension device 30 (504).

Upon receiving the logical path establishment notification (LPE) from the I/O device 40, the I/O side extension device 30 transmits the logical path status notification (LPATH_STSCHG_REP) indicating the status of the logical path, to the host 10 (505), and the host 10 (the host side extension device 20) transmits the logical path status reception notification (LPATH_STSCHG_ACPT), as a response to the logical path status notification, to the I/O side extension device 30 (506). After transmitting the logical path status notification (LPATH_STSCHG_REP), the I/O side extension device 30 monitors the response to the logical path status notification (512). When the logical path status reception notification (LPATH_STSCHG_ACPT) is not received until a prescribed period of time elapsed, the I/O side extension device 30 determines that the timeout has occurred, and releases the session.

Figure 6:
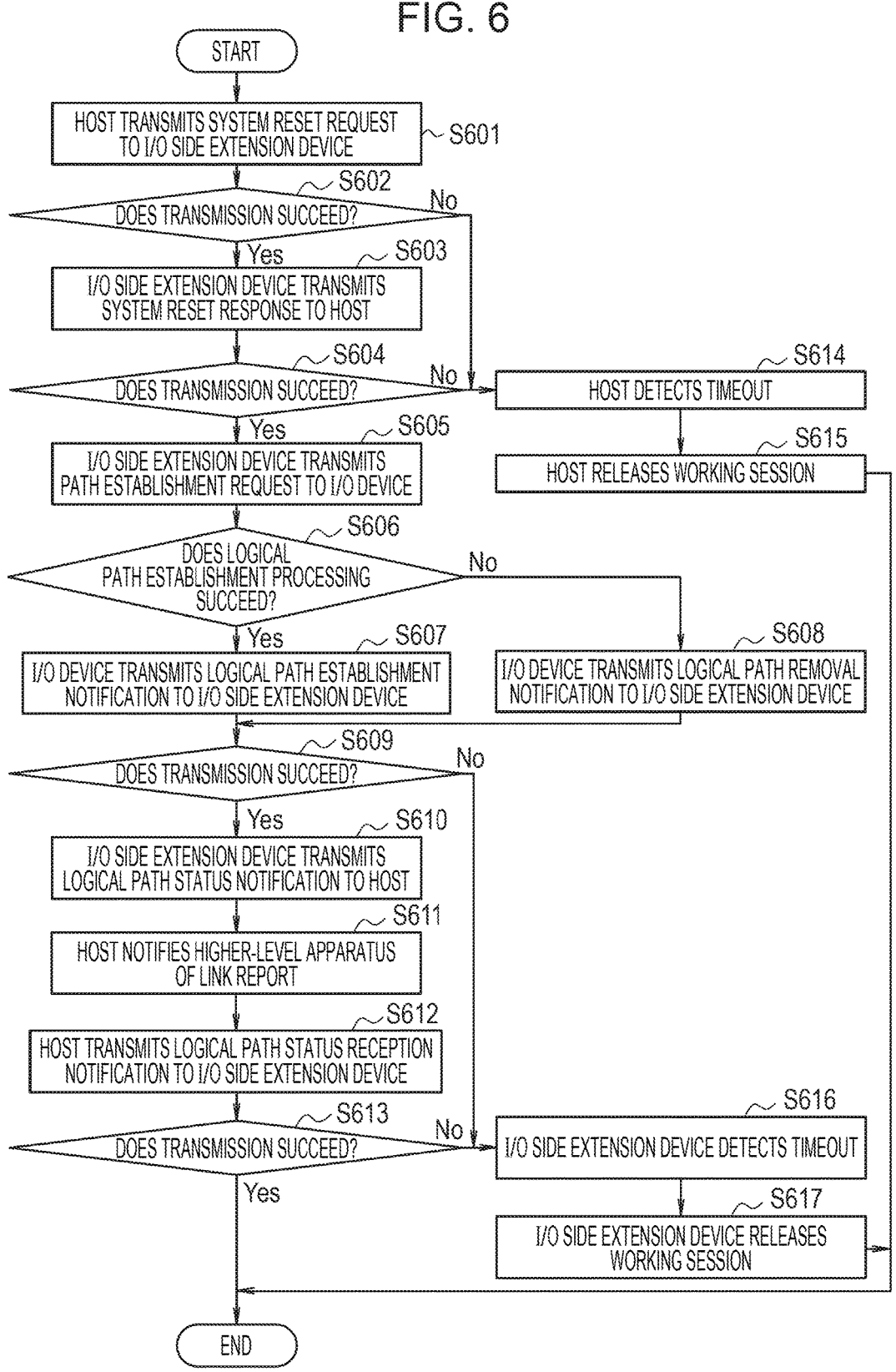
FIG. 6 is a flowchart illustrating an example of initialization processing according to the embodiment.

FIG. 6 is a flowchart illustrating an example of the initialization processing in the transmission and reception system according to the embodiment. In Step S601, the host 10 (the host side extension device 20) transmits the system reset request (SYSTEMRESET_REQ) to the I/O side extension device 30. In a case where the transmission of the system reset request (SYSTEMRESET_REQ) succeeds (YES in S602), in Step S603, the I/O side extension device 30 transmits the system reset response (SYSTEMRESET_RESP) to the host 10. In a case where the transmission of the system reset response (SYSTEMRESET_RESP) succeeds (Yes in S604), in Step S605, the I/O side extension device 30 transmits the logical path establishment request (ELP) for establishing the logical path that is requested by the system reset request, to the I/O device 40.

Next, in Step S606, the I/O device 40 determines whether or not the logical path establishment processing that is requested by the logical path establishment request (ELP) succeeds. In a case where it is determined that the logical path establishment processing succeeds (Yes in S606), in Step S607, the I/O device 40 transmits the logical path establishment notification (LPE) to the I/O side extension device 30, and notifies that the logical path establishment processing succeeds. On the other hand, in a case where it is determined that the logical path establishment processing does not succeed (No in S606), in Step S608, the I/O device 40 transmits a logical path removal notification (LPR: LogicalPathRemoved) to the I/O side extension device 30, and notifies that the logical path establishment processing has failed.

In a case where the transmission of the logical path establishment notification (LPE) or the logical path removal notification (LPR) succeeds (Yes in S609), in Step S610, the I/O side extension device 30 transmits the logical path status notification (LPATH_STSCHG_REP) to the host 10. Then, in Step S611, the host 10 creates a link report based on the logical path status notification, and notifies a higher-level apparatus of the created link report. Furthermore, in Step S612, the host 10 (the host side extension device 20) transmits the logical path status reception notification (LPATH_STSCHG_ACPT) to the I/O side extension device 30. In a case where transmission of the logical path status reception notification (LPATH_STSCHG_ACPT) succeeds (Yes in S613), the initialization processing is ended.

It is noted that in a case where the transmission of the system reset request (SYSTEMRESET_REQ) or the system reset response (SYSTEMRESET_RESP) does not succeed (No in S602 or S604), the host 10 (the host side extension device 20) detects the timeout (S614). When the timeout is detected, the host 10 releases the working session (S615) and ends the initialization processing.

Furthermore, in a case where the transmission of the logical path establishment notification (LPE), the logical path removal notification (LPR), or the logical path status reception notification (LPATH_STSCHG_ACPT) does not succeed (No in S609 or S613), the I/O side extension device 30 detects the timeout (S616). When the timeout is detected, the I/O side extension device 30 releases the working session (S617) and ends the initialization processing.

Figure 7:
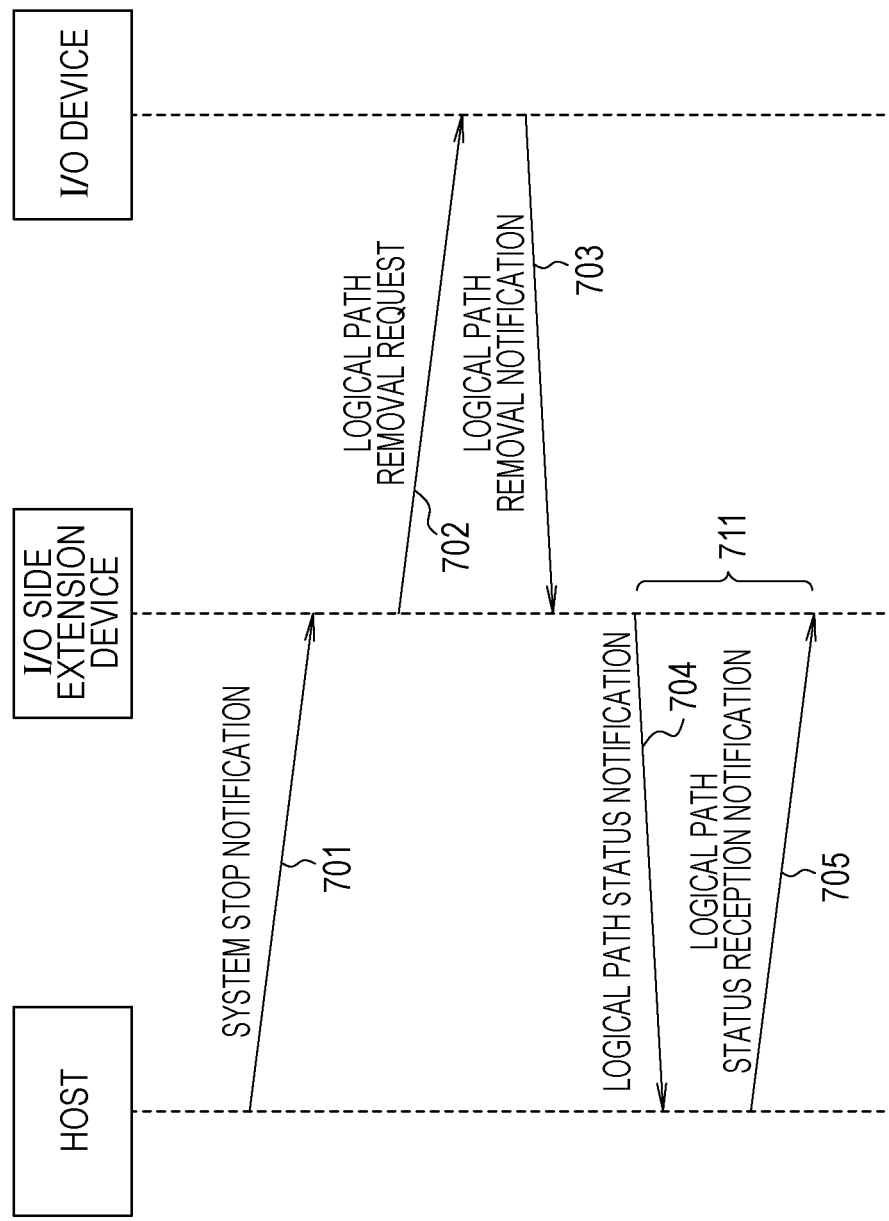
FIG. 7 is a diagram illustrating an example of a processing sequence for resetting and ending processing according to the embodiment.

FIG. 7 is a diagram illustrating an example of a processing sequence for resetting and ending processing in the transmission and reception system according to the embodiment. At this point, the resetting is soft resetting that is not accompanied by hard resetting in the energized state, and for example, is equivalent to the reconnection or the like that is made after the TCP session between the host side extension device 20 and the I/O side extension device 30, which is due to the cluster switching or the like. Furthermore, the ending is an operation of setting a channel to be in offline mode. The resetting and ending processing is performed when the resetting occurs or is ended.

The host 10 (the host side extension device 20) transmits the system stop notification (SYSTEMSTOP) to the I/O side extension device 30 (701). Upon receiving the system stop notification (SYSTEMSTOP) from the host 10 (the host side extension device 20), the I/O side extension device 30 transmits a logical removal request (RLP: RemoveLogicalPath) for removing the logical paths, to the I/O device 40 (702). When the logical path that is requested by the logical removal request (RLP) is removed, the I/O device 40 transmits the logical path removal notification (LPR) to the I/O side extension device 30 (703).

Upon receiving the logical path removal notification (LPR) from the I/O device 40, the I/O side extension device 30 transmits the logical path status notification (LPATH_STSCHG_REP) indicating the status of the logical path to the host 10 (704), and the host 10 (the host side extension device 20) transmits the logical path status reception notification (LPATH_STSCHG_ACPT), as a response to the logical path status notification, to the I/O side extension device 30 (705). After transmitting the logical path status notification (LPATH_STSCHG_REP), the I/O side extension device 30 monitors the response to the logical path status notification (711). In a case where the logical path status reception notification (LPATH_STSCHG_ACPT) is not received until a prescribed period of time elapsed, the I/O side extension device 30 determines that the timeout has occurred, and releases the session.

Figure 8:
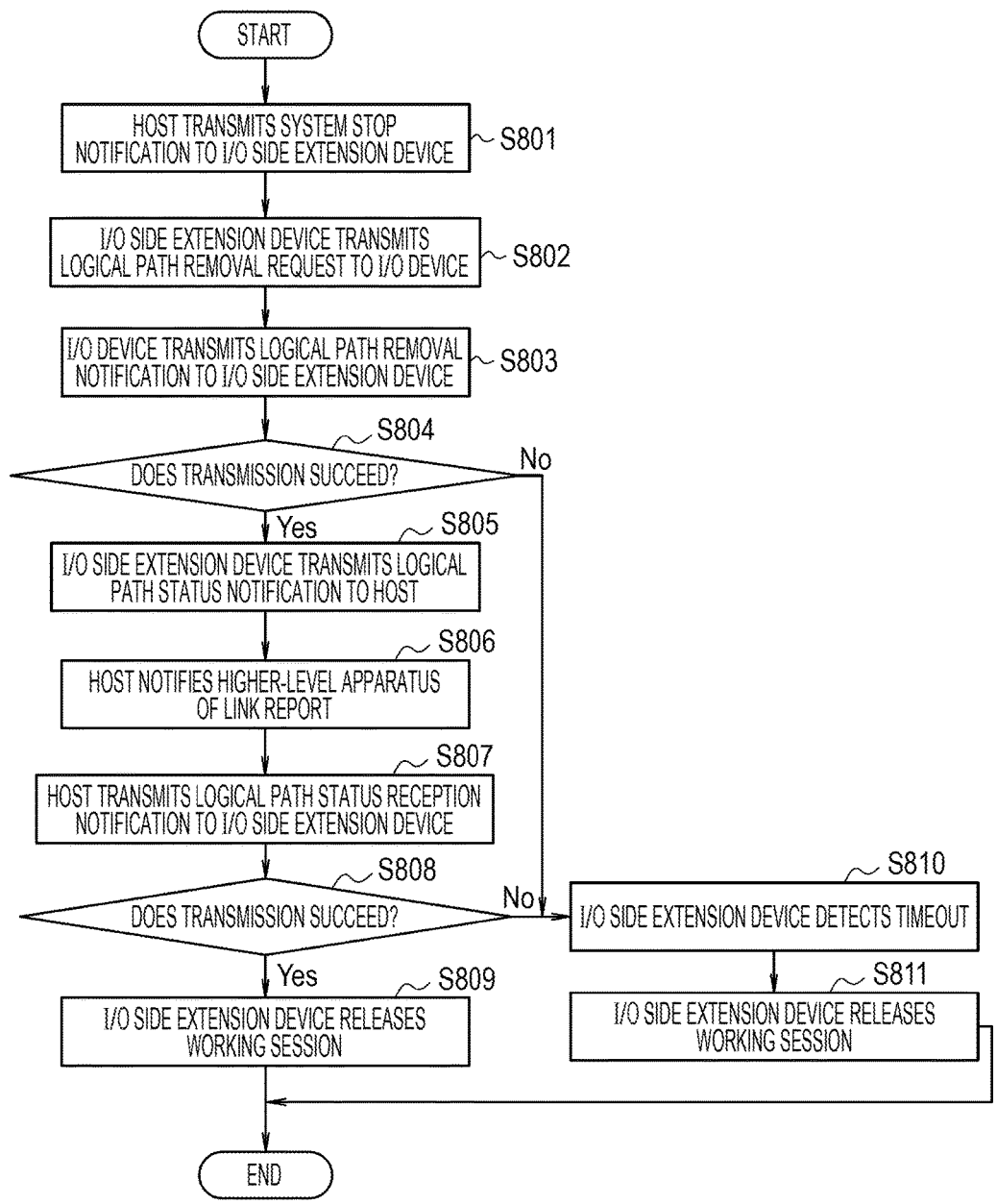
FIG. 8 is a flowchart illustrating an example of the resetting and ending processing according to the embodiment.

FIG. 8 is a flowchart illustrating an example of the resetting and ending processing in the transmission and reception system according to the embodiment. In Step S801, the host 10 (the host side extension device 20) transmits the system stop notification (SYSTEMSTOP) to the I/O side extension device 30. Next, in Step S802, the I/O side extension device 30 transmits the logical removal request (RLP) for removing the logical path, to the I/O device 40. Next, in Step S803, the I/O device 40 removes the logical path that is requested by the logical removal request (RLP), and transmits the logical path removal notification (LPR) to the I/O side extension device 30.

In a case where the transmission of the logical path removal notification (LPR) succeeds (Yes in S804), in Step S805, the I/O side extension device 30 transmits the logical path status notification (LPATH_STSCHG_REP) to the host 10. Then, in Step S806, the host 10 creates the link report based on the logical path status notification, and notifies a higher-level apparatus of the created link report. Furthermore, in Step S807, the host 10 (the host side extension device 20) transmits the logical path status reception notification (LPATH_STSCHG_ACPT) to the I/O side extension device 30. In a case where the transmission of the logical path status reception notification (LPATH_STSCHG_ACPT) succeeds (Yes in S808), in Step S809, the I/O side extension device 30 releases the working session (S809) and ends the resetting and ending processing.

It is noted that in a case where the transmission of the logical path removal notification (LPR) or the logical path status reception notification (LPATH_STSCHG_ACPT) does not succeed (No in S804 or S808), the I/O side extension device 30 detects the timeout (S810). When the timeout is detected, the I/O side extension device 30 releases the working session (S811) and ends the resetting and ending processing.

Figure 9:
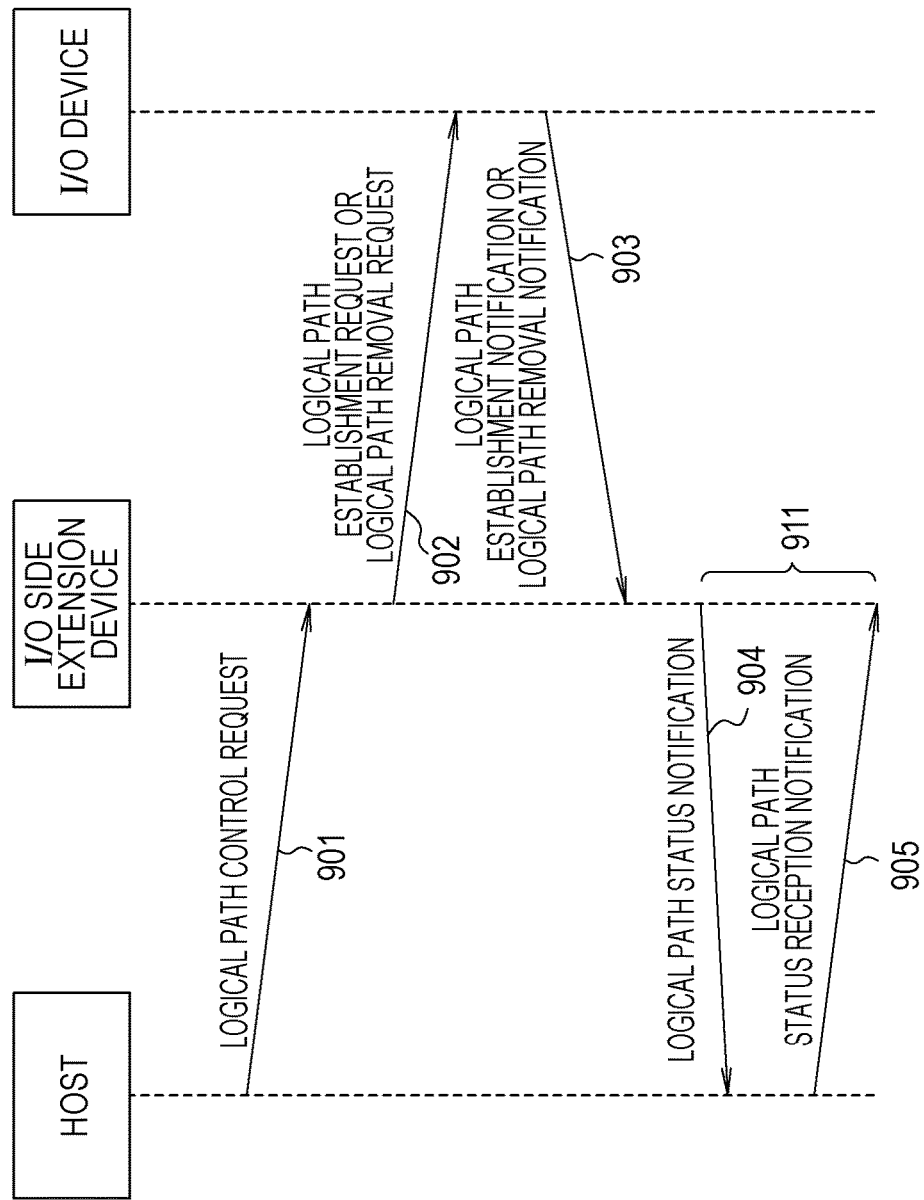
FIG. 9 is a diagram illustrating a processing sequence for logical path control processing according to the embodiment.

FIG. 9 is a diagram illustrating an example of a processing sequence for logical path control processing in the transmission and reception system according to the embodiment. The logical path control processing, for example, is processing that is performed when the virtual machine starts up or ends in the host, and is performed by transmitting the logical path control request. In the logical path control processing, the I/O side extension device 30 detects the logical path mismatch based on the logical path control request, establishes or removes the logical path between the I/O side extension device 30 and the I/O device 40, and thus the revision is made in such a manner a match is achieved.

The host 10 (the host side extension device 20) transmits the logical path control request (REBUILDLPATH_REQ) to the I/O side extension device 30 (901). Upon receiving the logical path control request (REBUILDLPATH_REQ) from the host 10 (the host side extension device 20), the I/O side extension device 30 detects a mismatch between the logical path that is requested by the logical path control request and a current logical path with reference to the logical path management table that is retained, and, in order to make a match, transmits the logical path establishment request (ELP) or the logical removal request (RLP) to the I/O device 40 (902).

When the logical path establishment request (ELP) is transmitted from the I/O side extension device 30, the I/O device 40 establishes the logical path that is requested by the logical path establishment request (ELP), and transmits the logical path establishment notification (LPE) to the I/O side extension device 30 (903). Furthermore, when the logical removal request (RLP) is transmitted from the I/O side extension device 30, the I/O device 40 removes the logical path that is requested by the logical removal request (RLP) and transmits the logical path removal notification (LPR) to the I/O side extension device 30 (903).

Upon receiving the logical path establishment notification (LPE) or the logical path removal notification (LPR) from the I/O device 40, the I/O side extension device 30 transmits the logical path status notification (LPATH_STSCHG_REP) indicating the status of the logical path (904) to the host 10, and the host 10 (the host side extension device 20) transmits the logical path status reception notification (LPATH_STSCHG_ACPT), as a response to the logical path status notification, to the I/O side extension device 30 (905). After transmitting the logical path status notification (LPATH_STSCHG_REP), the I/O side extension device 30 monitors the response to the logical path status notification (911). In the case where the logical path status reception notification (LPATH_STSCHG_ACPT) is not received until a prescribed period of time elapsed, the I/O side extension device 30 determines that the timeout has occurred, and releases the session.

Figure 10:
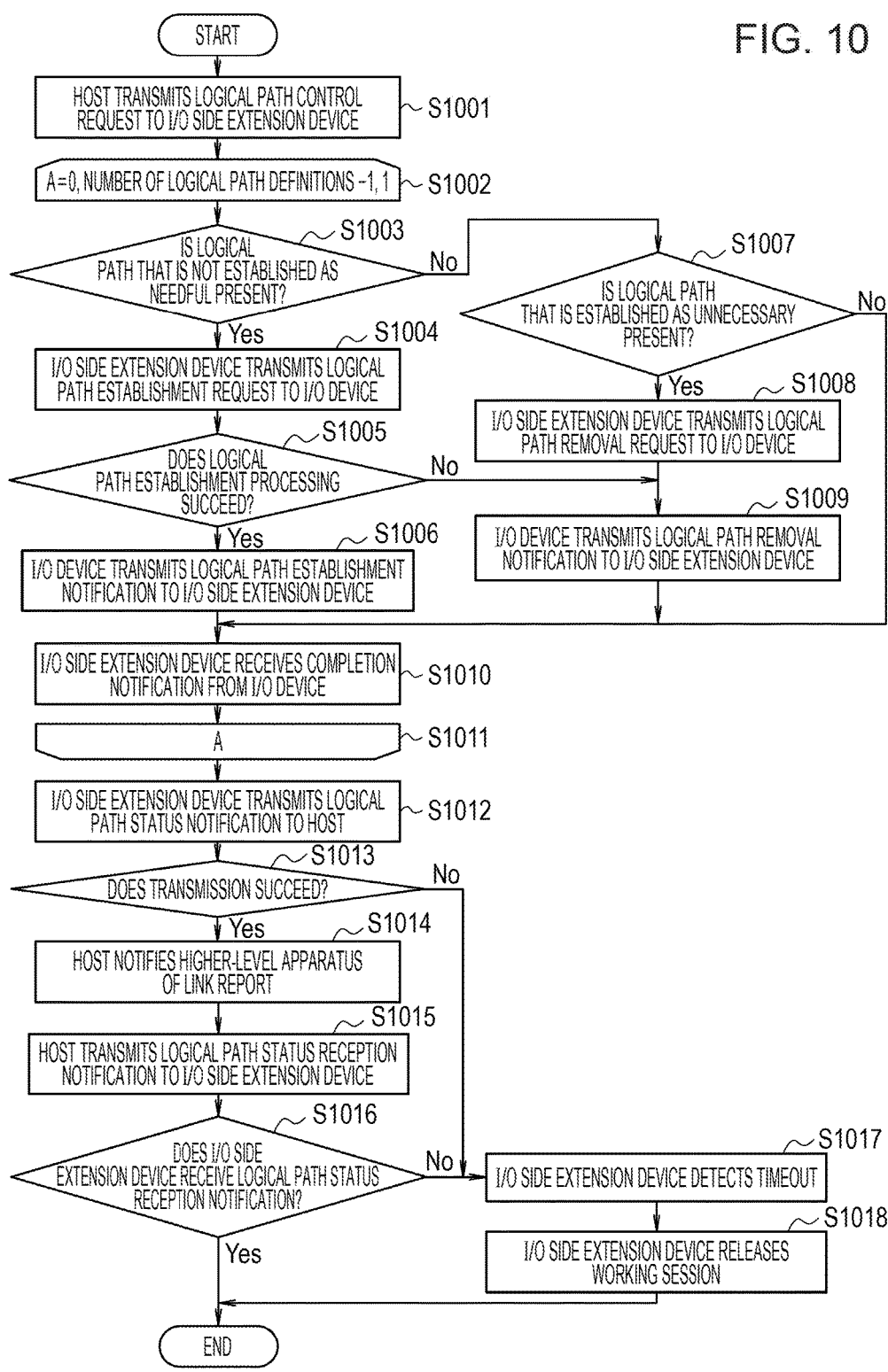
FIG. 10 is a flowchart illustrating an example of logical path control processing according to the embodiment.

FIG. 10 is a flowchart illustrating an example of the logical path control processing in the transmission and reception system according to the embodiment. In Step S1001, the host 10 (the host side extension device 20) transmits the logical path control request (REBUILDLPATH_REQ) to the I/O side extension device 30. Upon receiving the logical path control request (REBUILDLPATH_REQ) from the host 10 (the host side extension device 20), the I/O side extension device 30 sequentially selects logical path entries that the logical path control request (REBUILDLPATH_REQ) has, one by one, performs processing steps, Steps S1002 to S1011, and repeatedly performs processing steps, Steps S1002 to S1011 as many times as the number of the logical path entries (the number of logical path definitions). With loop processing steps S1002 to S1011, the logical path mismatch is revised (overcome).

In Step S1003, the I/O side extension device 30 determines whether or not the logical path that is requested in the selected logical path entry is a logical path that is needful but is not established. In a case where it is determined that the requested logical path is a logical path that is needful but is not established (Yes in S1003), processing to Step S1004 takes place. If not (No in S1003), proceeding to Step S1007 takes place.

In Step S1004, the I/O side extension device 30 transmits the logical path establishment request (ELP) for establishing the logical path that is requested in the selected logical path entry, to the I/O device 40. Next, in Step S1005, the I/O device 40 determines whether or not the logical path establishment processing, which is requested by the logical path establishment request (ELP), succeeds. In a case where it is determined that the logical path establishment processing succeeds (Yes in S1005), in Step S1006, the I/O device 40 transmits the logical path establishment notification (LPE) to the I/O side extension device 30, and proceeds to Step S1010. On the other hand, in a case where it is determined that the logical path establishment processing does not succeed (No in S1005), in Step S1009, the I/O device 40 transmits the logical path removal notification (LPR) to the I/O side extension device 30 and proceeds to Step S1010.

In Step S1007, the I/O side extension device 30 determines whether or not the logical path that is requested in the selected logical path entry is a logical path that is unnecessary but is established. In a case where it is determined that the requested logical path is a logical path that is unnecessary, but is established (Yes in S1007), proceeding to Step S1008 takes place. If not (No in S1007), proceeding to Step S1010 takes place.

In Step S1008, the I/O side extension device 30 transmits the logical removal request (RLP) for removing the logical path that is requested in the selected logical path, to the I/O device 40. Next, in Step S1009, the I/O device 40 removes the logical path that is requested by the logical removal request (ELP), transmits the logical path removal notification (LPR) to I/O side extension device 30, and proceeds to Step S1010.

In Step S1010, the I/O side extension device 30 receives a completion notification (the logical path establishment notification (LPE) or the logical path removal notification (LPR)) from the I/O device 40. Processing steps, Steps S1002 to S1011 are repeatedly performed as many times as the number of the logical path entries included in the logical path control request (REBUILDLPATH_REQ), and thus proceedings to Step S1012 takes place.

In Step S1012, the I/O side extension device 30 transmits the logical path status notification (LPATH_STSCHG_REP) to the host 10. In a case where the transmission of the logical path status notification (LPATH_STSCHG_REP) succeeds (Yes in S1013), in Step S1014, the host 10 creates a link report based on the logical path status notification and notifies a higher-level apparatus of the created link report. Furthermore, in Step S1015, the host 10 (the host side extension device 20) transmits the logical path status reception notification (LPATH_STSCHG_ACPT) to the I/O side extension device 30. In the case where the transmission of the logical path status reception notification (LPATH_STSCHG_ACPT) succeeds (Yes in S1016), the logical path control processing is ended.

It is noted that in a case where the transmission of the logical path status notification (LPATH_STSCHG_REP) or the logical path status reception notification (LPATH_STSCHG_ACPT) does not succeed (No in S1013 or S1016), the I/O side extension device 30 detects the timeout (S1017). When the timeout is detected, the I/O side extension device 30 releases the working session (S1018) and ends the logical path control processing.

In this manner, in a case where it is determined that a logical path, which, in the logical path control request (REBUILDLPATH_REQ), is set to be needful, is not established, the I/O side extension device 30 transmits the logical path establishment request to the I/O device 40, and establishes the logical path between the I/O side extension device 30 and the I/O device 40. More precisely, in a case where, in the logical path management table 13 that the host 10 has, a logical path is set to be needful, but where, in the logical path management table that the I/O side extension device 30 has, the logical path is not established between the I/O side extension device 30 and the I/O device 40, the I/O side extension device 30 establishes the logical path between the I/O side extension device 30 and the I/O device 40.

Furthermore, in a case where it is determined that a logical path, which, is set to be unnecessary in the logical path control request (REBUILDLPATH_REQ), is established, the I/O side extension device 30 transmits the logical removal request to the I/O device 40, and removes the logical path between the I/O side extension device 30 and the I/O device 40. More precisely, in a case where, in the logical path management table that the host 10 has, a logical path is set to be unnecessary, but where, in the logical path management table that the I/O side extension device 30 has, the logical path is established between the I/O side extension device 30 and the I/O device 40, the I/O side extension device 30 removes the logical path between the I/O side extension device 30 and the I/O device 40.

Accordingly, in a case where a mismatch takes place between the logical path relating to the communication with the I/O device 40, which is requested by the host 10, and the logical path between the I/O side extension device and the I/O device and the I/O device, the logical path between the I/O side extension device and the I/O device is revised in such a manner that a match is made. Thus, the logical path mismatch may be overcome and the matching property is possibly secured. For example, the logical path between the I/O side extension device and the I/O device is revised and thus the logical path mismatch is overcome. As a result, the communication between the host 10 and the I/O device 40 may be kept from not being established, and a normal operation, such as the input and output operation on the I/O device 40 or the shared I/O device's switching, may be performed.

Furthermore, in the operation for the logical path described, a response frame, such as the system reset response (SYSTEMRESET_RESP) or the logical path status reception notification (LPATH_STSCHG_ACPT), is transmitted for a frame to which a response needful. Since the response frame is transmitted for the frame to which the response is needful, a communication partner may be notified that the frame is received, and the system may be kept from operating while inconsistency in the information remains.

Furthermore, with regard to the frame to which a response is needful, not only is the response monitored, but a new frame is also prohibited from being transmitted before the response is received. In this manner, another frame may be kept from being received before the response frame, and thus the system may be kept from operating while inconsistency in the device status or the like between the host 10 (the host side extension device 20), the I/O side extension device 30, and the I/O device 40 remains. As a result, a malfunction or system breaking-down may be kept from occurring.

Figure 11:
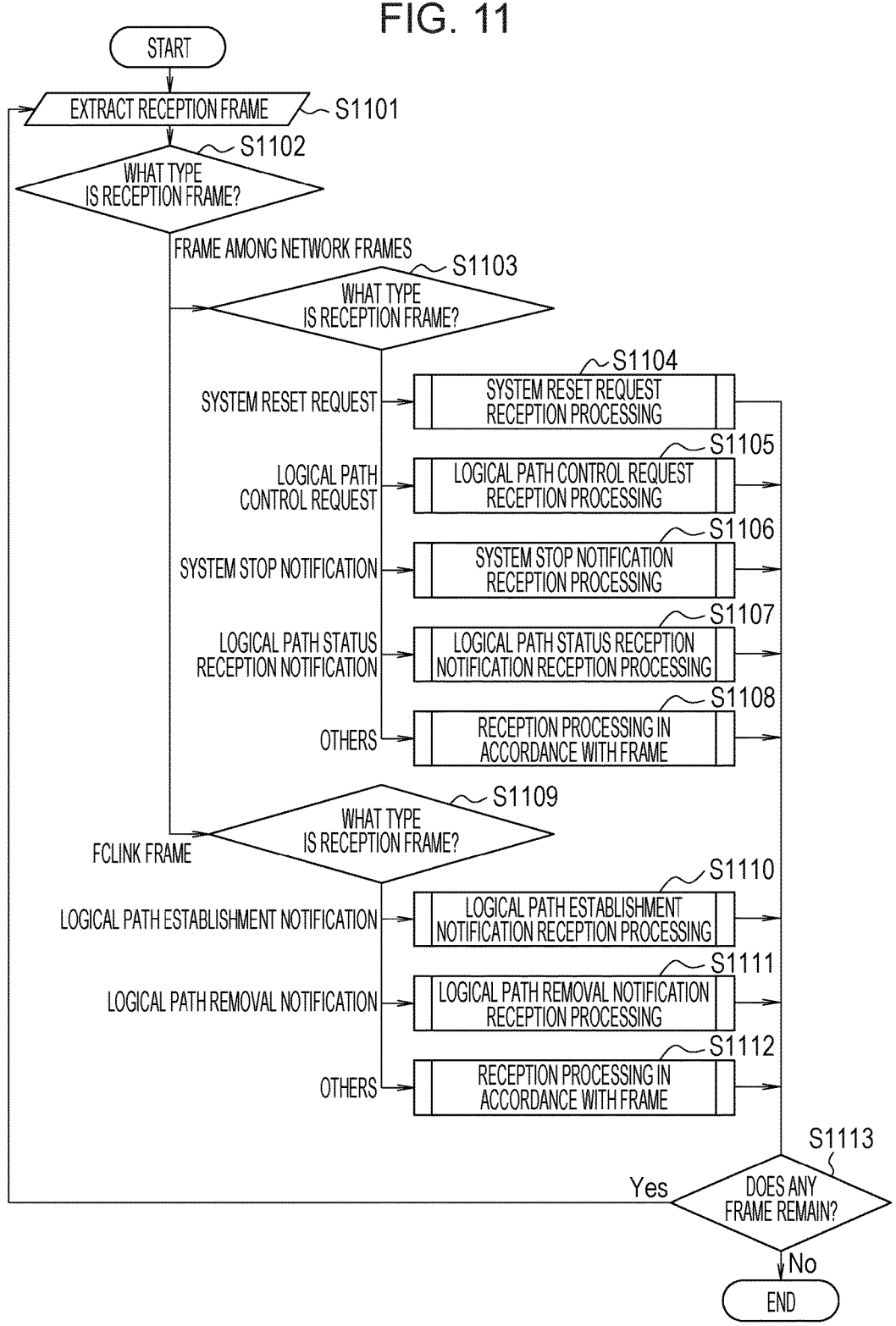
FIG. 11 is a flowchart illustrating an example of operation of a logical path controller according to the embodiment.

Next, operation of the logical path controller 32 will be described below. FIG. 11 is a flowchart illustrating an example of operation of the logical path controller at the time of the frame reception according to the embodiment. Upon receiving a frame via a network or FCLINK, the logical path controller 32 of the I/O side extension device 30 extracts a reception frame (S1101). Next, in Step S1102, the logical path controller 32 determines whether the reception frame is a frame from the network or a frame from FCLINK.

In a case where, in Step S1102, the logical path controller 32 determines that the reception frame is the frame from the network, in Step S1103, the logical path controller 32 determines that the frame received is a frame for the system reset request, the logical path control request, the system stop notification, the logical path status reception notification, or one other than these.

Figure 12:
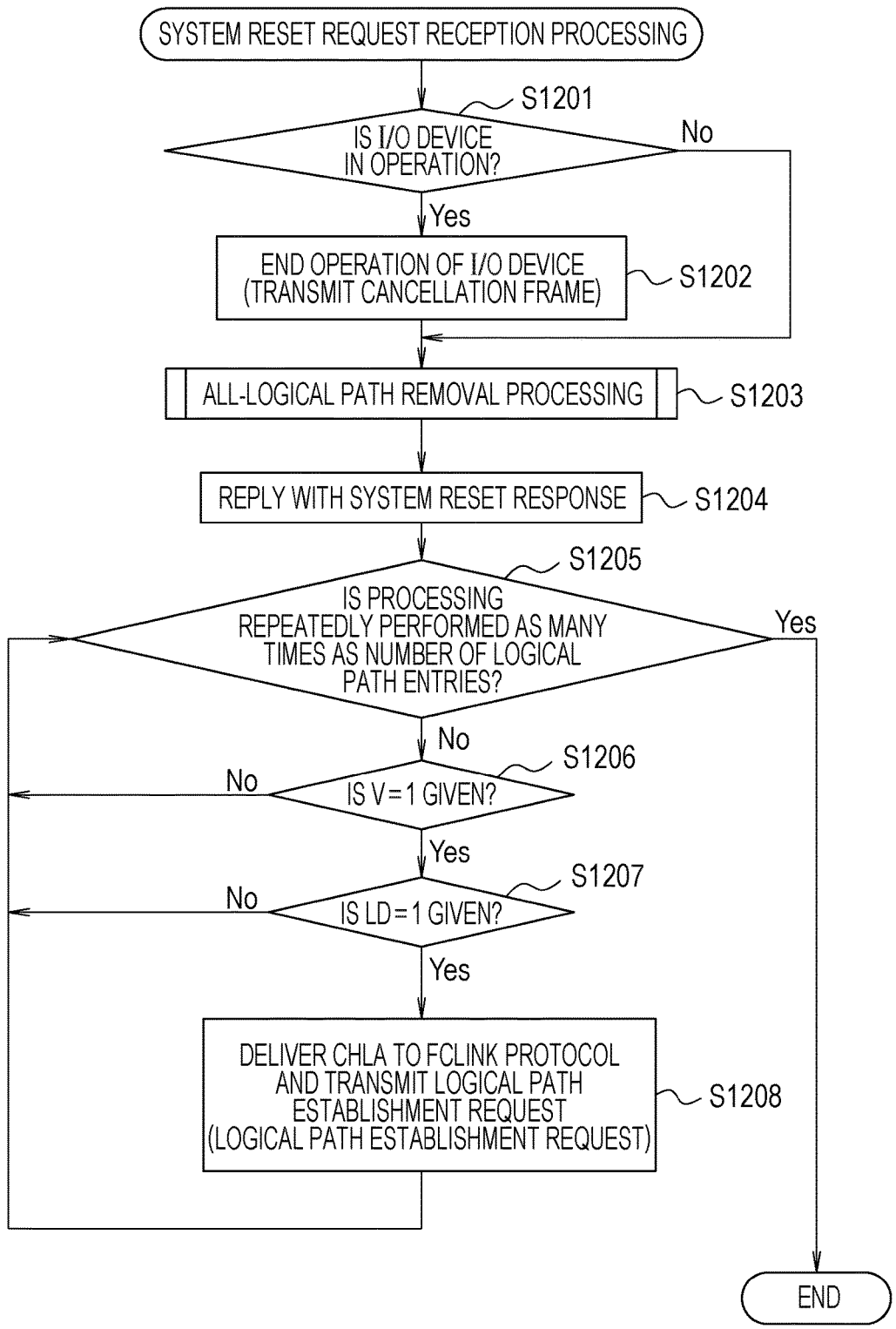
FIG. 12 is a flowchart illustrating an example of system reset request reception processing according to the embodiment.
Figure 14:
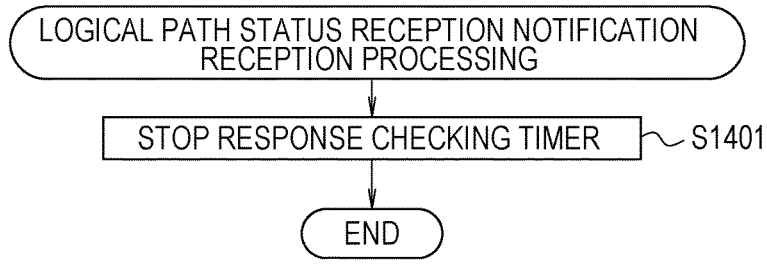
FIG. 14 is a flowchart illustrating an example of logical path status reception notification reception processing according to the embodiment.
Figure 15:
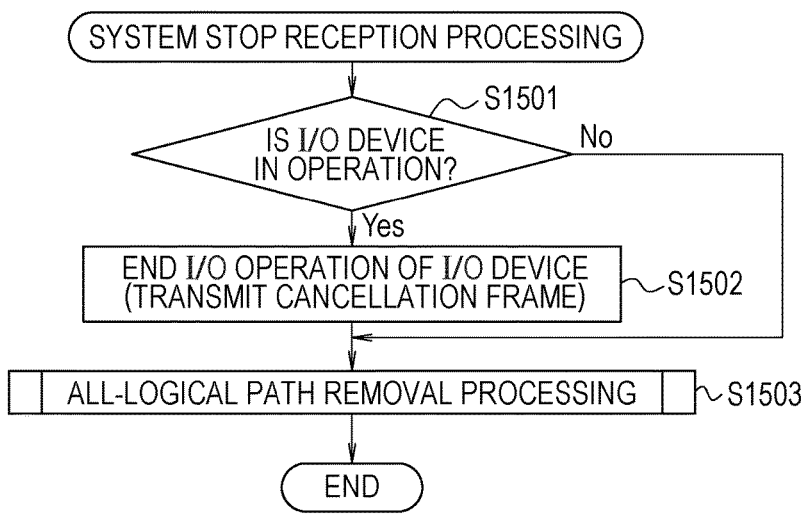
FIG. 15 is a flowchart illustrating an example of system stop notification reception processing according to the embodiment.
Figure 16:
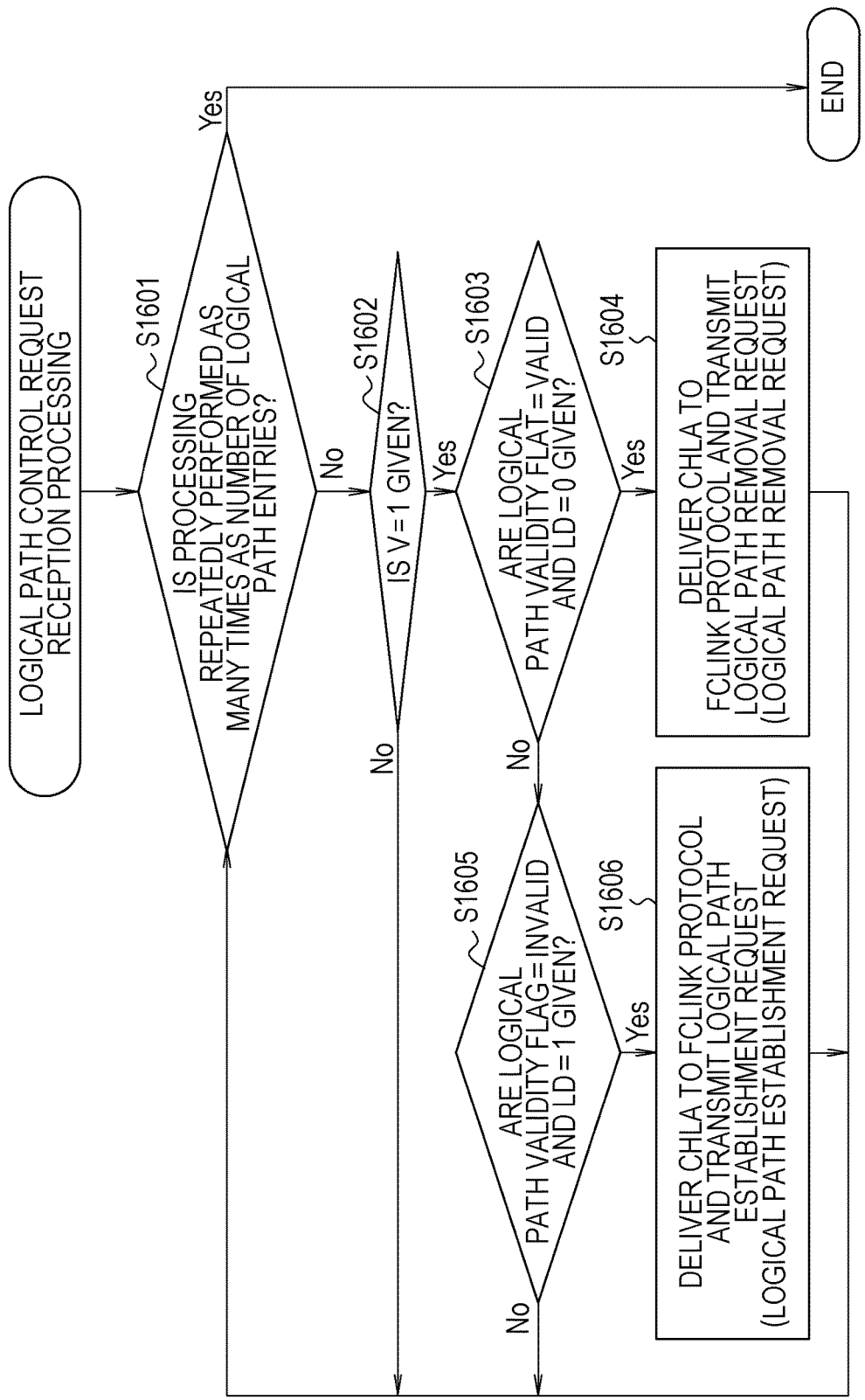
FIG. 16 is a flowchart illustrating an example of logical path control request reception processing according to the embodiment.

In a case where it is determined that the received frame is a frame for the system reset request, the logical path controller 32 performs system reset request reception processing that is illustrated in FIG. 12 (S1104). In a case where the received frame is a frame for the logical path control request, the logical path controller 32 performs logical path control request reception processing (S1105) that is illustrated in FIG. 16. Furthermore, in a case where it is determined that the received frame is a frame for the system stop notification, the logical path controller 32 performs system stop notification reception processing (S1106) that is illustrated in FIG. 15. In a case where the received frame is a frame for the logical path status reception notification, the logical path controller 32 performs logical path status reception notification reception processing (S1107) that is illustrated in FIG. 14. In a case where it is determined that the received frame is a frame for a request or a notification other than these, the logical path controller 32 performs reception processing (S1108) in accordance with the received request or notification.

In a case where, in Step S1102, the logical path controller 32 determines that the received frame is a frame from FCLINK, in Step S1109, the logical path controller 32 determines that a frame received is a frame for the logical path establishment notification, the logical path removal notification, or one other than these.

Figure 13:
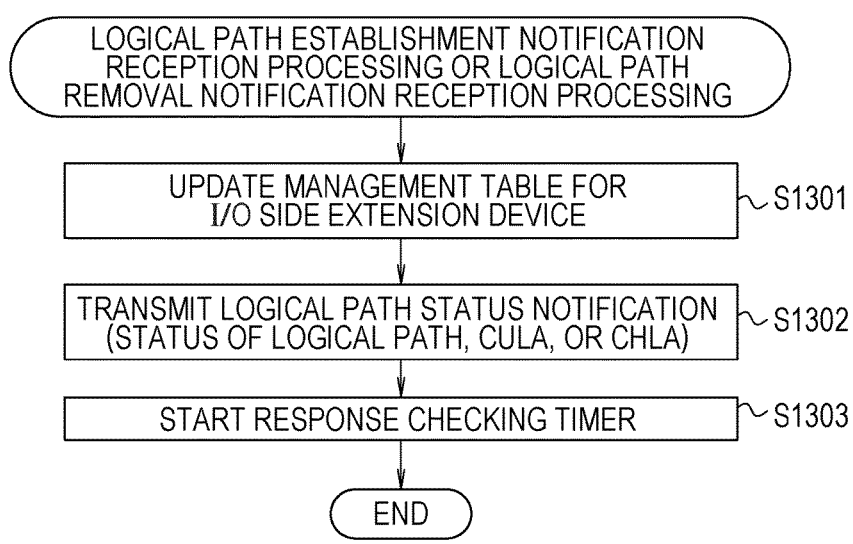
FIG. 13 is a flowchart illustrating an example of logical path establishment notification reception processing or logical path removal notification reception processing according to the embodiment.

In a case where it is determined that the received frame is a frame for the logical path establishment notification, the logical path controller 32 performs logical path establishment notification reception processing (S1110) that is illustrated in FIG. 13. In a case where it is determined that the received frame is the logical path removal notification, the logical path controller 32 performs logical path removal notification processing (S1111) that is illustrated in FIG. 13. Furthermore, in a case where it is determined that the received frame is a frame for a request or a notification other than these, the logical path controller 32 performs reception processing (S1112) in accordance with the received request or notification.

After each of the processing steps described above is performed, the logical path controller 32 determines whether or not any reception frame remains. When any reception frame remains, the logical path controller 32 returns to Step S1101, and when no reception frame remains, ends the processing.

Next, each of the processing steps in the logical path controller 32 will be described.

System Reset Request Reception Processing

FIG. 12 is a flowchart illustrating an example of the system reset request reception processing according to the embodiment. Upon receiving the system reset request from the host 10, the logical path controller 32 starts the system reset request reception processing. When starting the system reset request reception processing, in Step S1201, the logical path controller 32 determines whether or not the I/O device 40 is in operation for processing. As a result, in a case where it is determined that the I/O device 40 is in operation for processing, in Step S1202, the logical path controller 32 transmits a frame for cancelation of the processing to the I/O device 40 and causes the I/O device 40 to end the processing.

Next, in Step S1203, the logical path controller 32 performs all-logical path removal processing that removes all the logical paths between the I/O side extension device 30 and the I/O device 40. Then, in Step S1204, the logical path controller 32 replies to the host 10 with the system reset response in order to be synchronized to the host 10. Next, in Step S1205, the logical path controller 32 determines whether or not to have performed processing relating to the control of the logical path as many times as the number of the logical path entries included in the system reset request. As a result, in a case where it is determined that the processing is performed as many times as the number of the logical path entries, the system reset request reception processing is ended.

On the other hand, in a case where it is determined that the processing relating to the control of the logical path is not performed as many times as the number of the logical path entries included in the system reset request, in Step S1206, the logical path controller 32 determines whether or not a value of a bit B in the logical path that is processed is "1." As a result, in a case where the value of the bit V is "1," in Step S1207, the logical path controller 32 determines whether or not a value of a bit LD of the logical path entry is "1." As a result, in a case where the value of the bit LD of the logical path entry is "1," in Step S1208, the logical path controller 32 determines that the logical path that is designated in the logical entry is not established, and makes a request for the establishment of the logical path. The logical path controller 32 delivers a logical address CHLA on the host side to a FCLINK protocol, transmits the logical path establishment request, and returns to Step S1205.

Logical Bus Establishment Notification Reception Processing or Logical Bus Removal Notification Reception Procession FIG. 13 is a flowchart illustrating an example of the logical path establishment notification reception processing or the logical path removal notification reception processing according to the embodiment. Upon receiving the logical path establishment notification or the logical path removal notification from the I/O device 40, the logical path controller 32 starts the logical path establishment notification reception processing or the logical path removal notification reception processing. When starting the logical path establishment notification reception processing or the logical path removal notification reception processing, in Step S1301, the logical path controller 32 updates the logical path management table 36 that is retained by the memory 35, according to the logical path establishment notification or the logical path removal notification, which is received.

Next, in Step S1302, based on the updated logical path management table 36, the logical path controller 32 transmits the logical path status notification indicating the status of the logical path, the address CULA on the I/O device side, the address CHLA on the host side, and the like to the host 10. Then, in order to check that the logical path status notification reaches up to the host 10, the logical path controller 32 starts a response checking timer relating to the notification, and thus ends the logical path establishment notification reception processing or the logical path removal notification reception processing.

Logical Bus Status Reception Notification Reception Processing

FIG. 14 is a flowchart illustrating an example of the logical path status reception notification reception processing according to the embodiment. Upon receiving the logical path status reception notification from the host 10, the logical path controller 32 starts the logical path status reception notification reception processing. When starting the logical path status reception notification reception processing, in Step S1401, the logical path controller 32 stops operation of the response checking timer that is started in the logical path establishment notification reception processing or the logical path removal notification reception processing, and ends the logical path status reception notification reception processing.

System Stop Notification Reception Processing

FIG. 15 is a flowchart illustrating an example of the system stop notification reception processing according to the embodiment. Upon receiving the system stop notification from the host 10, the logical path controller 32 starts the system stop notification reception processing. When starting the system stop notification reception processing, in Step S1501, it is determined whether or not the I/O device 40 is in operation for processing. As a result, in the case where it is determined that the I/O device 40 is in operation for processing, in Step S1502, the logical path controller 32 transmits a frame for the cancelation of the processing to the I/O device 40 and causes the I/O device 40 to end the processing. Next, in Step S1503, the logical path controller 32 performs the all-logical path removal processing that removes all the logical paths between the I/O side extension device 30 and the I/O device 40, and ends the system stop notification reception processing.

Logical Path Control Request Reception Processing

FIG. 16 is a flowchart illustrating an example of the logical path control request reception processing according to the embodiment. Upon receiving the logical path control request from the host 10, the logical path controller 32 starts the logical path control request reception processing. When starting the logical path control request reception processing, in Step S1601, the logical path controller 32 determines whether or not to have performed the processing relating to the control of the logical path as many times as the number of the logical entries included in the received logical path control request. As a result, in a case where it is determined that the processing relating to the control of the logical path is performed as many times as the number of the logical path entries, the logical path control request reception processing is ended.

On the other hand, in a case where it is determined that the processing relating to the control of the logical path has not been performed as many times as the number of the logical entries included in the logical path control request, in Step S1602, the logical path controller 32 determines whether or not the value of the bit V of the logical path entry that is processed is "1." As a result, in a case where the value of the bit V of the logical path entry is "1," in Step S1603, the logical path controller 32 determines whether the logical path validity flag of the corresponding logical path in the logical path management table 36 is valid and the value of the bit LD of the logical path is "0." As a result, in a case where the logical path validity flag is valid and the value of the bit LD of the logical path entry is "0," in Step S1604, the logical path controller 32 determines that a logical path that is designated in the logical path entry is not removed, and makes a request to remove the logical path. The logical path controller 32 transmits the logical removal request to the FCLINK protocol by providing therewith the address CHLA on the host side, and then returns to Step S1601.

On the other hand, as a result of the determination in Step S1603, in a case where the logical path validity flag is not valid or where the value of the bit LD of the logical path entry is not "0," in Step S1605, the logical path controller 32 determines whether the logical path validity flag of the logical path management table 36 is invalid and the value of the bit LD of the logical path entry is "1." As a result, in a case where the logical path validity flag is invalid and the value of the bit LD of the logical path entry is "1," in Step S1606, the logical path controller 32 determines that the logical path that is designated in the logical path entry is not established, and makes a request to establish the logical path. The logical path controller 32 transmits the logical path establishment request to the FCLINK protocol by providing therewith the address CHLA on the host side, and returns to Step S1601. Furthermore, as a result of the determination in Step S1605, in a case where the logical path validity flag is invalid or where the value of the bit LD of the logical path entry is not "1," proceedings to Step S1601 takes place without executing control relating the logical path.

All-logical Path Removal Processing

Figure 17:
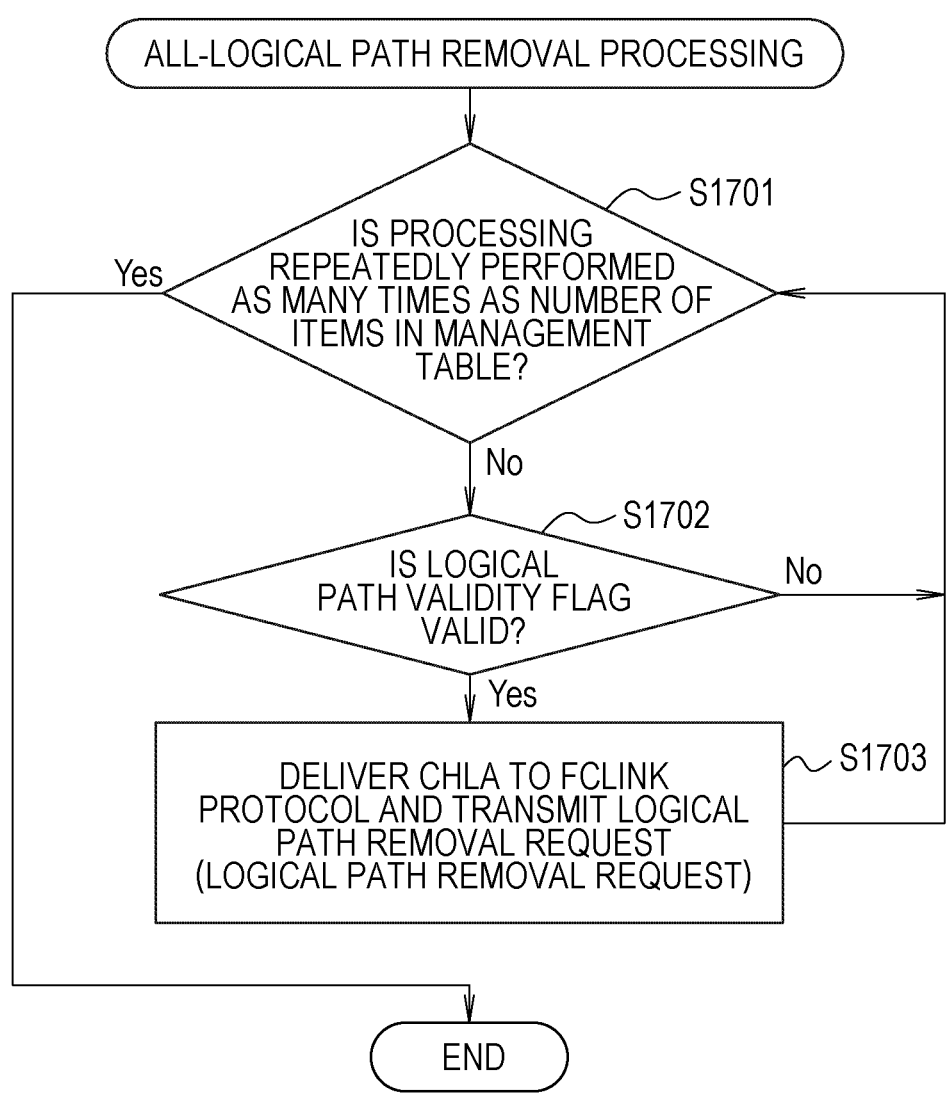
FIG. 17 is a flowchart illustrating an example of all-logical path removal processing according to the embodiment.

FIG. 17 is a flowchart illustrating an example of the all-logical path removal processing that is performed in Step S1203 illustrated in FIG. 12 and Step S1503 illustrated in FIG. 15. In the all-logical path removal processing, in Step S1701, the logical path controller 32 determines whether or not processing relating to the removal of as many logical paths as the number of items in the logical path management table 36 that is retained by the I/O side extension device 30, that is, as the number of the logical paths that are registered in the logical path management table 36. As a result, in a case where the processing relating to the removal of as many logical paths as the number of the items in the logical path management table 36 is performed, the all-logical path removal processing is ended.

On the other hand, in a case where it is determined that the processing relating to the removal of as many logical paths as the number of the items in the logical path management table 36, in Step S1702, the logical path controller 32 determines whether or not the valid flag of the logical path, which is to be processed, within the logical path management table indicates validity. As a result, in a case where it is determined that the valid flag of the logical path is not valid, returning to Step S1701 takes place. As a result of the determination in Step S1702, in a case where the valid flag of the logical path is valid, in Step S1703, the logical path controller 32 transmits the logical removal request to the FCLINK protocol by providing therewith the address CHLA on the host side, and then returning to Step S1701 takes place.

Figure 18A:
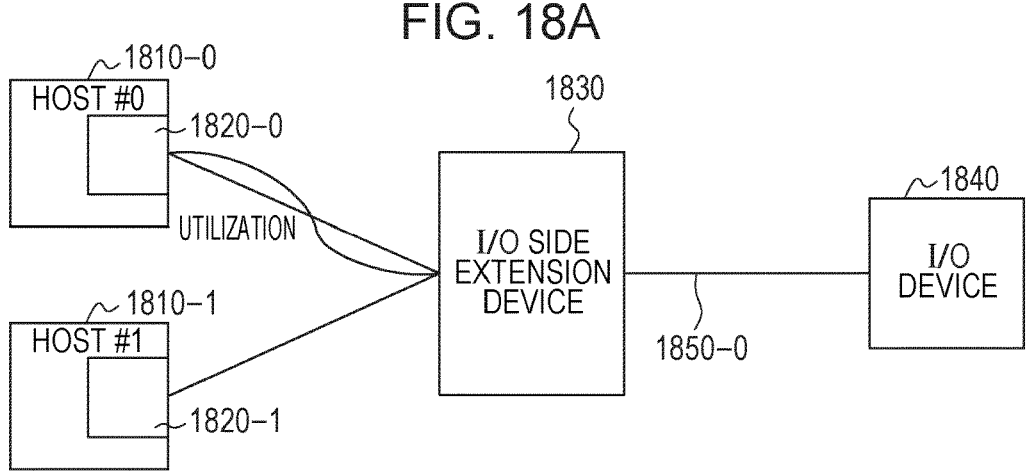
FIG. 18A to 18C are diagrams, each for describing an example of the operation of the transmission and reception system according to the embodiment.
Figure 18B:
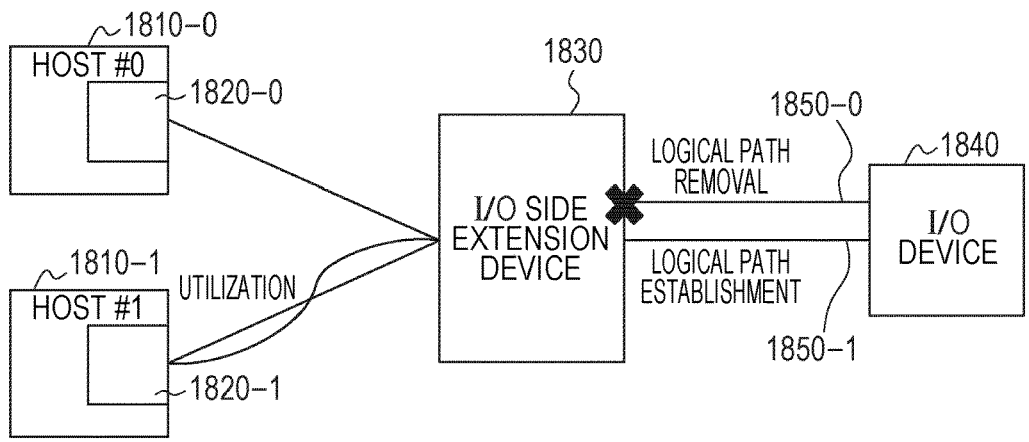
Figure 18C:
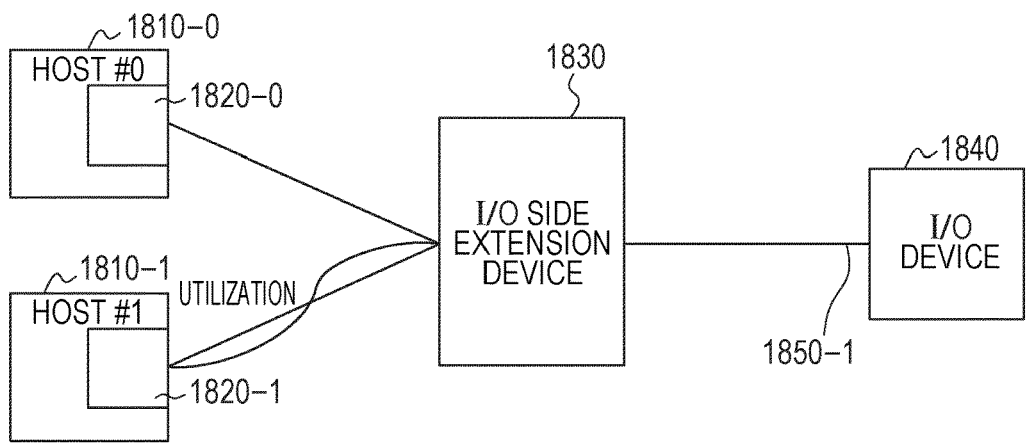

FIGS. 18A to 18C are diagrams, each illustrating an example of flag switching function of executing the logical path control according to the embodiment. The flag switching function is a function for switching a connection between the host and the I/O device in the system in which one I/O device is shared among a plurality of hosts. In FIGS. 18A to 18C, it is assumed that hosts 1810-0 and 1810-1 and an I/O side extension device 1830 are coupled via a network such as a wide area Ethernet, and the I/O side extension device 1830 and an I/O device 1840 are coupled through the FCLINK connection.

As illustrated in FIG. 18A, when a host #0 (1810-0) utilizes an I/O device 1840 that is shared, a logical path 1850-0 for a host #0 is established between the I/O side extension device 1830 and the I/O device 1840. It is assumed that, in a status that is illustrated in FIG. 18A, the cluster switching occurs, the host that utilizes the I/O device 1840 is switched from the host #0 (1810-0) to a host #1 (1810-1), and as illustrated in FIG. 18B, switching to the host #1 (1810-1) side takes place for the path between the host and the I/O side extension device 30. Because the logical path 1850-0 for the host #0 is already established between the I/O side extension device 1830 and the I/O device 1840, the logical path mismatch occurs.

At this time, in order to revise (overcome) the logical path mismatch, between the I/O side extension device 1830 and the I/O device 1840, the I/O side extension device 30 not only removes the logical path 1850-0 for the host #0, but also establishes the logical path 1850-1 for the host #1. The control of the logical path is executed in this manner, and thus, as illustrated in FIG. 18C, the mismatch between a logical path that is requested by the host #1 and the current logical path between the I/O side extension device 1830 and the I/O device 1840 is overcome. As a result, the matching property of the logical path is secured, and thus the safe utilization of the I/O device 40 is possible.

It is noted that the embodiment described above is only an example of mere specification in implementing the embodiment and that this is not intended to interpret the technical scope of the embodiment in a limited manner. That is, the embodiment can be implemented in various forms in a range that does not depart from the technical ideal or principal feature of the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system comprising:
an information processing apparatus including a first processor;
a relay device including a second processor; and
an input and output device including a third processor and being coupled to the information processing apparatus via the relay device, wherein:
the relay device includes a memory configured to store first logical-path information indicating information on communication logical paths used for communication between the information processing apparatus and the input and output device, the communication logical paths each including a device logical path used between the relay device and the input and output device; and
the second processor of the relay device is coupled to the memory and configured to, upon detection of a mismatch between the first logical-path information and second logical-path information that is requested from the information processing apparatus and includes information on target communication logical paths to be used for communication between the information processing apparatus and the input and output device, control setting of the device logical path included in each of the communication logical paths so that the communication logical paths are consistent with the target communication logical paths indicated by the second logical-path information.

2. The transmission and reception system of claim 1, wherein
when it is determined that a first communication logical path among the communication logical paths, which is determined to be necessary for establishing the target communication logical path indicated by the second logical-information, is not established yet, the second processor of the relay device establishes the first communication logical path by setting a first device logical path between the relay device and the input and output device so that the first communication logical path including the first device logical path is consistent with the target communication logical path.

3. The transmission and reception system of claim 2, wherein
when it is determined that a second communication logical path among the communication logical paths, which is determined to be unnecessary by the second logical-information, is established, the second processor of the relay device removes the second communication logical path by deleting a second device logical path included in the second communication logical path and established between the relay device and the input and output device.

4. The transmission and reception system of claim 1, wherein
after controlling setting of the device logical paths between the relay device and the input and output device based on the second logical-path information, the second processor of the relay device updates the first logical-path information stored in the memory, based on a state of the communication logical paths each including the device logical path whose setting has been controlled.

5. The transmission and reception system of claim 1, wherein
after controlling setting of the device logical paths between the relay device and the input and output device based on the second logical-path information, the second processor of the relay device notifies the information processing apparatus of a state of the communication logical paths each including the device logical path whose setting has been controlled.

6. The transmission and reception system of claim 1, wherein
the relay device and the input and output device are coupled via a connection scheme in compliance with a fibre channel-single byte-2 (FC-SB-2) standard.

7. A method performed in a system in which an information processing apparatus is coupled to an input and output device via a relay device, the method comprising:
providing the relay device with first logical-path information indicating information on communication logical paths used for communication between the information processing apparatus and the input and output device, the communication logical paths each including a device logical path used between the relay device and the input and output device; and
upon detection of a mismatch between the first logical-path information and second logical-path information that is requested from the information processing apparatus and includes information on target communication logical paths to be used for communication between the information processing apparatus and the input and output device, controlling, by the relay device, setting of the device logical path included in each of the communication logical paths so that the communication logical paths are consistent with the target communication logical paths indicated by the second logical-path information.

8. A relay device coupled to an information processing apparatus and an input and output device, the relay device comprising:
a memory configured to store first logical-path information indicating information on communication logical paths used for communication between the information processing apparatus and the input and output device, the communication logical paths each including a device logical path used between the relay device and the input and output device; and
a processor coupled to the memory and configured to, upon detection of a mismatch between the first logical-path information and second logical-path information that is requested from the information processing apparatus and includes information on target communication logical paths to be used for communication between the information processing apparatus and the input and output device, control setting of the device logical path included in each of the communication logical paths so that the communication logical paths are consistent with the target communication logical paths indicated by the second logical-path information.

* * * * *